United States Patent
Mori et al.

[11] Patent Number: 5,485,316
[45] Date of Patent: Jan. 16, 1996

[54] ILLUMINATION OPTICAL SYSTEM FOR ENDOSCOPES

[75] Inventors: Takao Mori; Takayuki Suzuki, both of Tokyo, Japan

[73] Assignee: Olympus Optical Co., Ltd., Tokyo, Japan

[21] Appl. No.: 965,691

[22] Filed: Oct. 23, 1992

[30] Foreign Application Priority Data

Oct. 25, 1991 [JP] Japan ................................. 3-305531
Oct. 25, 1991 [JP] Japan ................................. 3-305540

[51] Int. Cl.$^6$ ........................... G02B 3/02; G02B 13/18; G02B 6/32
[52] U.S. Cl. ........................... 359/708; 359/362; 385/33
[58] Field of Search ........................... 359/656–662, 359/708–717, 206, 385, 839, 434; 385/33; 128/4–6; 362/32

[56] References Cited

U.S. PATENT DOCUMENTS

| | | | |
|---|---|---|---|
| 4,610,513 | 9/1986 | Nishioka et al. | 385/33 |
| 4,662,725 | 5/1987 | Nisioka | 359/708 |
| 4,784,118 | 11/1988 | Fantone et al. | 359/434 |
| 4,824,225 | 4/1989 | Nishioka | 385/33 |
| 4,878,745 | 11/1989 | Endo et al. | 359/708 |
| 4,929,070 | 5/1990 | Yokota et al. | 359/708 |
| 4,952,040 | 8/1990 | Igarashi | 359/708 |
| 4,953,937 | 9/1990 | Kikuchi et al. | 385/33 |

FOREIGN PATENT DOCUMENTS

| | | |
|---|---|---|
| 56-20428 | 2/1981 | Japan . |
| 58-95706 | 6/1983 | Japan . |
| 62-178207 | 8/1987 | Japan . |

*Primary Examiner*—Paul M. Dzierzynski
*Assistant Examiner*—Thong Nguyen
*Attorney, Agent, or Firm*—Cushman, Darby & Cushman

[57] ABSTRACT

An illumination optical system for endoscopes which comprises a lens component having at least one aspherical surface in a shape $F(h)$ satisfying the condition mentioned below, and satisfies relationship of $h=f\cdot\theta$ or $h=f\cdot\sin\theta$. This illumination optical system is capable of providing favorable luminance distributions on all planar surfaces, spherical surfaces and tubular surfaces.

$$\frac{0.5\sin(h/f_1)}{\sqrt{n^2 - 0.5\sin^2(h/f_1) - 1}} \leq \frac{dF(h)}{dh} \leq \frac{1.2h}{\sqrt{n^2 f_1^2 - 2h^2} - f_1}$$

16 Claims, 18 Drawing Sheets

ILLUMINATION OPTICAL SYSTEM FOR ENDOSCOPES

BACKGROUND OF THE INVENTION

1. Field of the Invention

The present invention relates to an illumination optical system for endoscopes.

2. Description of the Prior Art

In recent years, it has been demanded to widen field angles of illumination optical systems for endoscopes under a trend where objective optical systems for endoscopes have wider field angles. Further, it has been demanded to develop illumination optical systems which illuminate objects to be observed with adequate luminance distributions.

As a conventional example of the illumination optical systems for endoscopes which respond to the demands described above, there is known an optical system disclosed by Japanese Patent Kokai Publication No. Sho 56-20,428. This illumination optical system has a composition as illustrated in FIG. 1, wherein a positive lens system 2 is disposed before a light guide 1 consisting of an optical fiber bundle so that a light bundle emerging from the light guide is once converged and then diverged for illumination at a wide field angle.

When a ray that emerges from the light guide 1 in parallel with an optical axis of the light guide 1 is incident on the lens system 2 at a height of h and the ray having the height h of incidence emerges from the lens system 2 at an angle of $\theta$, this conventional illumination optical system is configured so as to have a relationship between the height h of incidence and the angle of emergence $\theta$ expressed by the following formula:

$$h = f \cdot \sin\theta$$

wherein the reference symbol f represents a focal length of the illumination optical system.

A distribution of relative luminance which is obtained by illuminating a planar object with this conventional illumination optical system is determined as described below. When a surface of an object which is perpendicular to an optical axis of an optical system and a completely diffusing planar surface is illuminated by rays which are emitted from a light source and have passed through the optical system, relative luminance on the surface which is set in a direction at an angle of $\theta$ relative to the optical axis is expressed by the following formula (i):

$$F(\theta) = (\beta/\beta_M \times \beta/\beta_S)^{-1} \qquad \ldots \text{(i)}$$

wherein the reference symbol $\beta$ represents a paraxial magnification for the surface of the object, and the reference symbols $\beta_M$ and $\beta_S$ designate magnifications in the meridional direction and the sagittal direction respectively relative to the surface of the object.

When the object is located sufficiently far from an exit pupil of the lens system, $\beta_M$ and $\beta_S$ used in the above-mentioned formula (i) are given by the following formulae (ii) and (iii) respectively:

$$\beta_M = \beta \cos^2\theta \{dA(\theta)/d\theta\} \qquad \ldots \text{(ii)}$$

$$\beta_S = \beta \{A(\theta)/\tan\theta\} \qquad \ldots \text{(iii)}$$

wherein $A(\theta) = h/f$.

From the above-mentioned formulae (ii) and (iii), it will be understood that, when the planar object having the completely diffusing surface is illuminated through the above-described illumination optical system, the distribution of relative luminance is $F(\theta) = \cos^4\theta$ and the luminance is lowered from a center toward marginal portions of the object in proportion to $\cos^4\theta$ as illustrated in FIG. 2. In FIG. 2, the ordinate represents luminance on the surface of the object and the abscissa designates the angle of emergence of the ray from the lens system described above.

When a surface of a spherical object or a tubular object is illuminated by rays which have passed through this conventional illumination optical system, a distribution of relative luminance can be determined as described below: A distribution of relative luminance on a completely diffusing surface of the spherical object and a distribution of relative luminance on a completely diffusing surface of the tubular object are generally given by the following formulae (v) and (vi) respectively:

$$G(\theta) = F(\theta) \times 1/\cos^3\theta \qquad \ldots \text{(v)}$$

$$H(\theta) = F(\theta) \times \tan^3\theta \qquad \ldots \text{(vi)}$$

wherein the reference symbols $G(\theta)$ and $H(\theta)$ represent distributions of relative luminance on the completely diffusing surfaces of the spherical object and the tubular object respectively.

From the above-mentioned formulae (v) and (vi), it will be understood that the distribution of relative luminance on the completely diffusing surface of the spherical object and that on the completely diffusing surface of the tubular object are expressed as $G(\theta) = \cos\theta$ and $H(\theta) = \cos\theta \sin^3\theta$ respectively, or as illustrated in FIG. 2.

As is apparent from FIG. 2, the luminance on the completely diffusing surface of the spherical object is lowered from the center toward the marginal portion thereof, but the distribution of relative luminance poses no problem for practical use, whereas the distribution of relative luminance on the completely diffusing surface of the tubular object is not enhanced abruptly at marginal portions of a visual field and adequate.

In case of an illumination optical system which satisfies $h = f \sin\theta$ like the above-described conventional illumination optical system, a second surface and a third surface, as counted from the object side, of the illumination optical system must have strong refractive powers when this optical system is to be configured so as to have a wide field angle for observing objects through an observation optical system which has a wide field angle of 110° or larger. When the second surface and the third surface have strong refractive powers, h is not proportional to $\sin\theta$, and rays having large heights are totally reflected by a first surface and the third surface of the illumination optical system. Further, the rays are more apt to be totally reflected as these rays have larger heights of incidence and luminance is lowered abruptly within a region exceeding the wide field angle of 110°.

Furthermore, there is known, as an example of illumination optical systems, which are usable in combination with observation optical systems having field angles of 110° and larger, an optical system disclosed by Japanese Patent Kokai Publication No. Sho 58-95,706. This optical system has a composition illustrated in FIG. 3 and requires a manufacturing cost which is higher than that of the conventional optical system shown in FIG. 1 since the former comprises lens components in a number larger than that of the lens components comprised in the latter.

Moreover, there is known, as an illumination optical system which can illuminate planar objects with a uniform distribution of luminance, there is known an optical system in which the height h of incidence is nearly proportional to tangent of the angle of emergence θ. This is an illumination optical system disclosed by Japanese Patent Kokai Publication No. Sho 62-178,207 which has a composition illustrated in FIG. 4. However, objects to be observed through endoscopes are not only planar objects but also spherical objects, tubular objects and other various objects having different forms. Objects to be observed through medical endoscopes are, for example, spherical objects such as interiors of stomachs, and tubular objects such as alimentary canals and bronchi.

When a spherical object is illuminated with a light bundle having passed through the illumination optical system in which h is proportional to tan θ, it will be understood from the formulae (i) and (v) that luminance is enhanced from a center toward a marginal portion in proportion to $1/\cos^3 \theta$ as indicated by G(θ) in FIG. 5. In an actual illumination system, however, rays which are to travel toward the marginal portions of a visual field are irregularly and totally reflected by the inside of the outer circumferential surface of a lens component, whereby these rays are not used for illumination. Accordingly, luminance is lowered abruptly as indicated by the curve b in FIG. 6. Consequently, the distribution of luminance on the spherical surface has ring-shaped non-uniformities. In FIG. 6, the curves a, b and c represent distributions of luminance on the planar surface, the spherical surface and the tubular surface respectively.

When the tubular surface is illuminated with a light bundle which has passed through this conventional illumination optical system, luminance is enhanced abruptly toward the marginal portion in proportion to $\tan^3 \theta$ as is understood from the formulae (i) and (vi).

This conventional illumination optical system provides only a narrow range within which objects can be observed with adequate brightness and is not desirable for practical use.

SUMMARY OF THE INVENTION

A primary object of the present invention is to provide an illumination optical system for endoscopes which can be manufactured at a low cost and assure little loss of light amounts, and which is usable with endoscopes having field angles of 110° and larger, and capable of illuminating spherical surfaces with nearly uniform distribution of luminance as well as planar surfaces and tubular surfaces with favorable distributions of luminance.

The illumination optical system for endoscopes according to the present invention is to be used in combination with an endoscope as illustrated in FIG. 7, wherein the reference numeral 11 represents a distal end of the endoscope, the reference numeral 12 designates a light guide, which consists of a large number of optical fibers and is adopted as a light source, the reference numeral 13 denotes an illumination lens system (an illumination optical system), and the reference numeral 14 represents an objective lens system (an observation optical system).

DETAILED DESCRIPTION OF THE PREFERRED EMBODIMENTS

Figure 1:
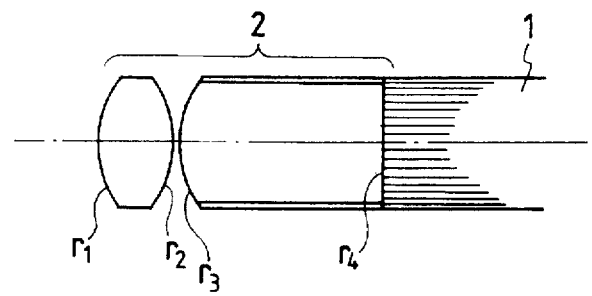
FIG. 1 shows a sectional view illustrating the conventional illumination optical system.

A first type of the illumination optical system according to the present invention comprises a light emitting source and an illumination lens system which includes a positive lens component for directing a light bundle emitted from the light source toward an object. In the above-mentioned illumination lens system, at least one lens component has an aspherical surface. This aspherical surface has a shape which lowers a radius of curvature as portions of the aspherical surface are farther from an optical axis thereof. When a focal length of the illumination lens system which uses, in place of the aspherical surface, a reference sphere of the aspherical surface is represented by f, a height of incidence of a ray which is emitted from the light emitting source and incident on the illumination lens system is designated by h and angle of emergence, on the illumination lens system, of the ray having the height h and emerging from the illumination lens system is represented by $\theta$, the illumination optical system according to the present invention nearly satisfies the relationship of $h=f\cdot\theta$.

It is desirable that the first type of the illumination optical system according to the present invention, which has the composition described above and nearly satisfies the relationship of $h=f\cdot\theta$, further satisfies the following condition (1):

$$\frac{0.5 \sin (h/f_1)}{\sqrt{n^2 - 0.5 \sin^2 (h/f_1)} \quad -1} \leq \frac{dF_\theta (h)}{dh} \leq \frac{1.5 \sin (h/f_1)}{\sqrt{n^2 - 1.5 \sin^2 (h/f_1)} \quad -1} \quad (1)$$

$$0 \leq h \leq D$$

wherein the reference symbol $F_\theta(h)$ represents a function expressing a shape of the aspherical surface, the reference symbol $f_1$ designates a focal length of the lens component having the aspherical surface and the reference symbol n denotes a refractive index of the lens component having the aspherical surface, and the reference symbol D represents a maximum value of the height of incidence.

Then, a second type of the illumination optical system for endoscopes according to the present invention comprises a light emitting source and an illumination lens system including a positive lens component for directing a light bundle emitted from the light source toward an object and the illumination lens system includes a lens component which has an aspherical surface. This aspherical surface has a shape which lowers a radius of curvature as portions of the aspherical surface are farther from the optical axis. When a focal length of the illumination lens system which uses, in place of the aspherical surface, a reference sphere thereof, is represented by f, a height of incidence of a ray which is emitted from the light emitting source in parallel with the optical axis and is incident on the illumination lens system is designated by h and an angle of emergence, form the illumination lens system, of the ray having the height of h is denoted by $\theta$, the illumination optical system is configured so as to satisfy the relationship of $h=f\cdot\sin \theta$. Further, the second type of the illumination optical system according to the present invention is configured so as to satisfy the following condition (2):

$$\frac{0.6h}{\sqrt{n^2 f_1^2 - 0.6h^2} \quad -f_1} \leq \frac{dF_{\sin\theta} (h)}{dh} \leq \frac{1.2h}{\sqrt{n^2 \cdot f_1^2 - 2h^2} \quad -f_1} \quad (2)$$

Furthermore, favorable distributions of luminance can be obtained with the illumination optical system according to the present invention when the optical system has a relation of the height h of incident ray versus the angle of emergence $\theta$ which is intermediate between $h=f\cdot\theta$ and $h=f\cdot\sin \theta$, and satisfies the following condition (4);

$$\frac{0.5 \sin (h/f_1)}{\sqrt{n^2 - 0.5 \sin (h/f_1)} \quad -1} \leq \frac{dF(h)}{dh} \leq \frac{1.2h}{\sqrt{n^2 f_1^2 - 2h^2} \quad -f_1} \quad (4)$$

wherein the reference symbol F(h) represents a function expressing a shape of the aspherical surface used in the above-mentioned illumination optical system.

In the illumination optical system having the relation which is intermediate between $h=f\cdot\theta$ and $h=f\cdot\sin \theta$, a value of the height h of the incident ray, which corresponds to a certain value of the angle of emergence $\theta$ is intermediate between a value of $f\cdot\theta$ and a value of $f\cdot\sin \theta$.

Now, the illumination optical system for endoscopes according to the present invention will be described in more detail below:

First, description will be made of the first type of the illumination optical system for endoscopes according to the present invention. Objects which are to be observed through endoscopes have various forms: not only planar objects but also spherical objects, tubular objects and objects having many other forms. Since the illumination optical system for endoscopes must be used for illuminating the objects which have various forms as described above, it is insufficient for the illumination optical system for endoscopes that the optical system be capable of illuminating only planar surfaces with uniform distributions of luminance. In order to illuminate the planar surfaces, the spherical surfaces and the tubular surfaces with adequate distributions of luminance, the first type of the illumination optical system according to the present invention must nearly satisfy the relationship of $h=f\cdot\theta$.

Figure 8:
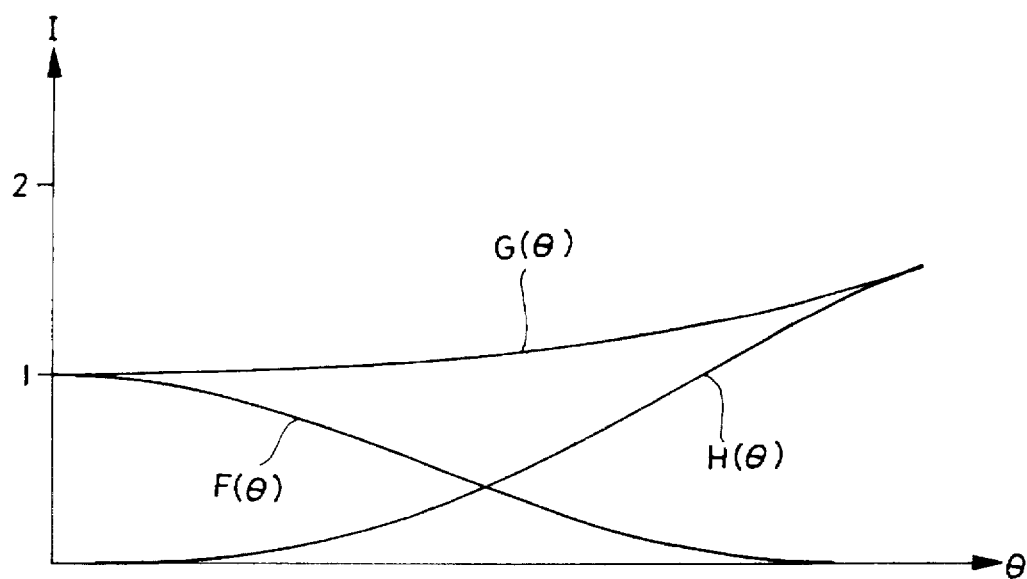
FIG. 8 shows graphs illustrating luminance distributions on a planar object, a spherical object and a tubular object which are illuminated by using the illumination optical system.

When a planar surface, a spherical surface and a tubular surface which are completely diffusing surfaces are illuminated by using the first type of the illumination optical system satisfying the relationship of $h=f\cdot\theta$, distributions of relative luminance are expressed as $F(\theta)=\theta\cos^3\theta/\sin \theta$, $G(\theta)=\theta/\sin \theta$ and $H(\theta)=\theta \sin^2 \theta$ respectively. These distributions of relative luminance are visualized in FIG. 8.

Figure 9:
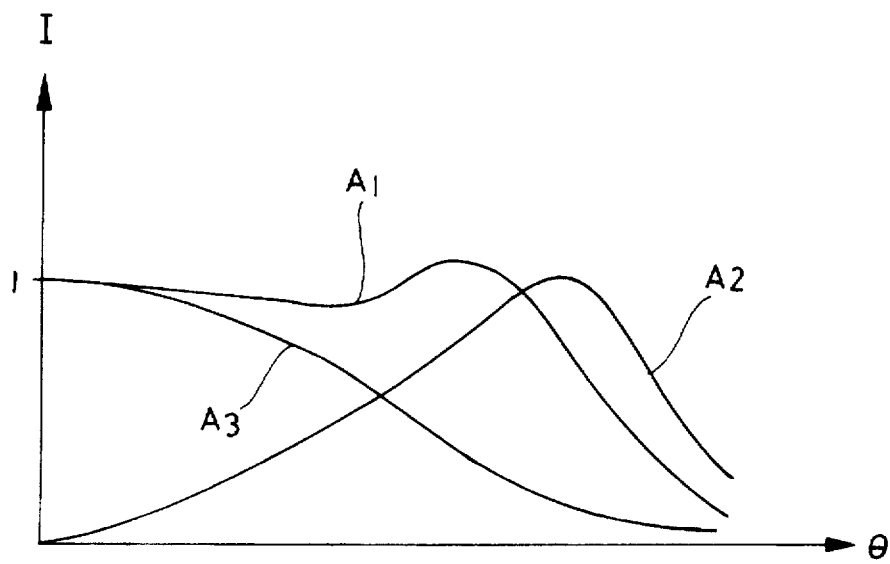
FIG. 9 shows graphs illustrating luminance distributions on the planar object, the spherical object and the tubular object including total reflections in the illumination optical system according to the present invention.

As is apparent from this drawing, luminance is distributed on the spherical surface so that luminance is enhanced from a center toward a marginal portion of the spherical surface along a $\theta/\sin \theta$ curve. In practice, however, rays which are to be used for illumination of the marginal portions of a visual field are reflected irregularly and totally by the inside of the outer circumference of the lens component so as to be directed outside the visual field, whereby luminance is abruptly lowered as the marginal portions of the visual field. Consequently, luminance is actually distributed as illustrated in FIG. 9. In this drawing, the curves $A_1$, $A_2$ and $A_3$ indicate the distributions of luminance on the spherical surface, the tubular surface and the planar surface respectively. As is understood from these curves, formed in the distributions of luminance are ring-shaped non-uniformities which are similar to those produced in the distributions of luminance obtained with the conventional illumination optical system nearly satisfying relationship of $h=f\cdot\tan \theta$. However, luminance on the non-uniformities (the ring-shaped non-uniformities) is low and these non-uniformities pose no problem for practical use, whereby the distributions of luminance obtained with the first type of the illumination optical system for endoscopes according to the present invention can be regarded as nearly uniform.

In contrast, the illumination optical system which nearly satisfies $h=f\cdot\theta$ as the relationship between the height of incident ray and the angle of emergence permits illuminating the spherical surface with nearly uniform distribution of luminance. When the tubular surface is illuminated by using this illumination optical system, there is posed no problem for practical use though a range within which luminance is distributed adequately is more or less narrower than a range obtained with the illumination optical system nearly satisfying the relationship of $h = f \cdot \sin \theta$.

When the planar surface is illuminated by using the illumination optical system satisfying the above-mentioned relationship, luminance is distributed more favorably than the distribution of luminance obtainable with the illumination optical system which satisfies the relationship of $h = f \cdot \sin \theta$.

As is understood from the foregoing description, the illumination optical system which comprises at least one positive lens component and nearly satisfies the relationship of $h = f \cdot \theta$ is suited for observation through an observation optical system having a wide field angle exceeding 110°. Further, it is possible to compose the illumination optical system which satisfies the above-mentioned relationship of a small number of lens components by using, on the above-mentioned lens component, at least one aspherical surface and lowering a radius of curvature as portions of the aspherical surface are farther from the optical axis.

It is possible to compose the illumination optical system that satisfies the above-mentioned relationship and assures little loss of light amounts by using, for example, a single lens component which has a planar surface on the object side and an aspherical surface on the side of light incidence.

Figure 10:
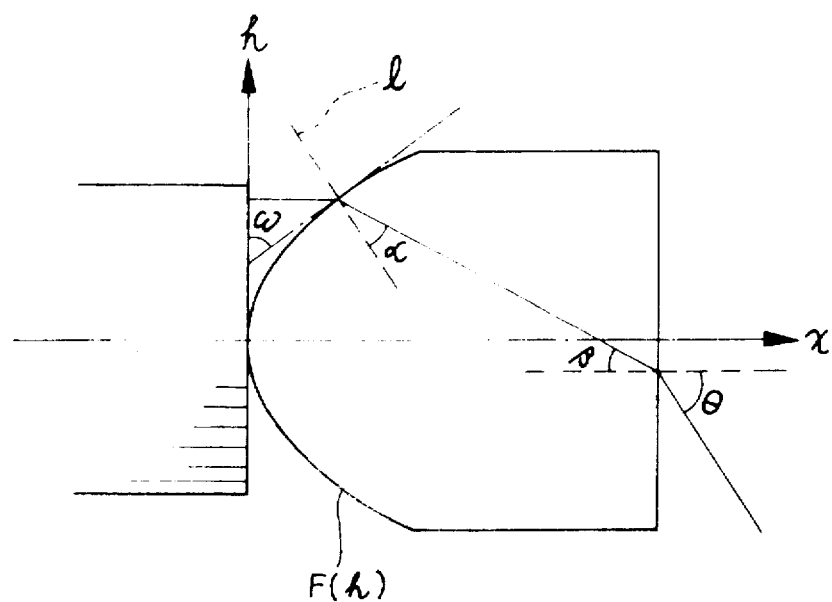
FIG. 10 shows a sectional view illustrating conditions of incident and emerging rays on and from a lens component having an aspherical surface.

An aspherical surface which is required for the illumination optical system comprising the lens component shown in FIG. 10 to satisfy the relationship of $h = f \cdot \theta$ is determined as described below:

Let us assume, in FIG. 10, that the direction of the optical axis is taken as the x axis, the direction perpendicular to the optical axis is taken as the h axis, $F(x)$ represents a function expressing the required aspherical surface, an angle formed between a tangential line on a surface expressed by the function $F(h)$ at a location having coordinates values of $(h, x) = (h, F(h))$ and the h axis is designated by $\omega$, a refracting angle of a ray incident at a height of h on a normal l to the above-mentioned surface at the coordinates values of $(h, F(h))$ is denoted by $\alpha$, an angle of incidence of this ray on the object side surface of the lens system is represented by $\beta$, an angle of emergence from this surface is represented by $\theta$, a refractive index of the illumination lens (the above-mentioned lens component) is designated by n and a focal length of the illumination lens component is denoted by f. Then relationship between the height h of the incident ray and the angle of emergence $\theta$ of the ray is given by the following formula (vi):

$$h = f \cdot \theta \quad \ldots \text{(vi)}$$

Let us determine a formula $x = F_\theta(h)$ expressing a shape of the aspherical surface satisfying the formula (vi).

First, the following five formulae (vii) through (x) are applicable:

$$h = f \cdot \theta \quad \text{(vi)}$$
$$\alpha + \beta = \omega \quad \text{(vii)}$$
$$n \sin \alpha = \sin \omega \quad \text{(viii)}$$
$$n \sin \beta = \sin \theta \quad \text{(ix)}$$
$$\tan \omega = \frac{dF_\theta(h)}{dh} \quad \text{(x)}$$

From the above-mentioned formulae (vi), (vii), (viii) and (ix), we obtain a relation expressed by the following formula (xi):

$$\tan \omega = \frac{\sin(h/f)}{\sqrt{n^2 - \sin^2(h/f)} - 1} \quad \text{(xi)}$$

From the following formulae (x) and (xi), we obtain the formula (xii) which will be described later:

$$\frac{dF_\theta(h)}{dh} = \frac{\sin(h/f)}{\sqrt{n^2 - \sin^2(h/f)} - 1} \quad \text{(xii)}$$

From the formula (xii), $F_\theta(h)$ can be expressed by the following formula (xiii):

$$F_\theta(h) = \int \frac{\sin(h/f) \, dh}{\sqrt{n^2 - \sin^2(h/f)} - 1} \quad \text{(xiii)}$$

When it is allowed to assume that h is proportional to $\sin \theta$, the formula expressing the shape of the aspherical surface can be represented as follows:

$$\frac{dF_{\sin\theta}(h)}{dh} = \frac{h}{\sqrt{n^2 f^2 - h^2} - f} \quad \text{(xiv)}$$

Figure 11:
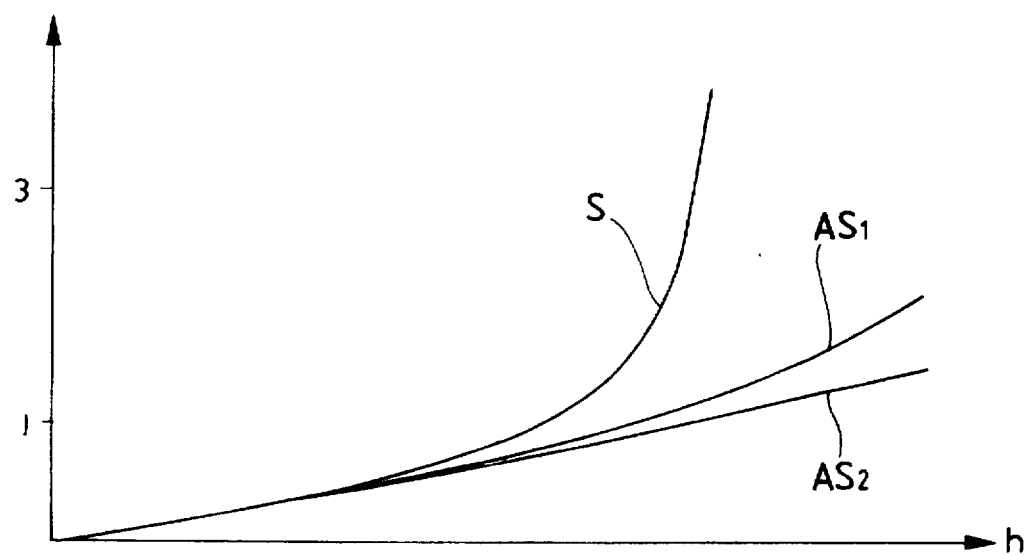
FIG. 11 shows graphs illustrating relations, relative to inclinations, of heights h of rays incident on a spherical surface and an aspherical surface.

The shapes of the aspherical surfaces which are expressed by the formulae (xii) and (xiv) have inclinations increasing at rates lower than that of an increasing rate of an inclination spherical surface having a focal length equal to that of the aspherical surfaces as illustrated in FIG. 11. In FIG. 11, the ordinate represents an increasing rate of inclination, the abscissa designates h, and the curve S denotes a spherical surface, and the curves $AS_1$ and $AS_2$ represent graphs related to aspherical surfaces to be used in the optical systems which satisfy $h = f \cdot \sin \theta$ and $h = f \cdot \theta$ respectively.

Since the relationship between the height h of the incident ray and the angle of emergence $\theta$ is determined by the inclination of the aspherical surface in case of the illumination optical system which uses the lens component having a planar surface on the object side, the illumination optical system satisfying $h = f \cdot \theta$ uses an aspherical surface satisfying the formula (xiii).

It is desirable that an aspherical surface which is to be used in the illumination optical system nearly satisfying $h = f \cdot \theta$ as the relationship between the height h of incident ray and the angle of emergence $\theta$ from the illumination optical system has a shape satisfying the following condition (1):

$$\frac{0.5 \sin(h/f_1)}{\sqrt{n^2 - 0.5 \cdot \sin^2(h/f_1)} - 1} \leq \frac{dF_\theta(h)}{dh} \leq \frac{1.5 \sin(h/f_1)}{\sqrt{n^2 - 1.5 \sin^2(h/f_1)} - 1} \quad (1)$$

$$0 \leq h \leq D$$

wherein the reference symbol D represents a maximum height of the incident ray and the reference symbol $f_1$ designates a focal length of the reference sphere of the aspherical surface on the lens component which is to be used in the illumination optical system according to the present invention.

If the lower limit of the condition (1) is exceeded, loss of light amounts will be increased by too strong a refractive power when a lens surface having refractive power is used in the illumination optical system and the ring-shaped non-uniformities will easily be produced when a spherical object is illuminated through this optical system.

If the upper limit of condition (1) is exceeded, in contrast, the reference sphere of the aspherical surface will have an enhanced radius of curvature, molding dies for manufacturing the aspherical surface cannot be prepared with high precision when the aspherical surface is to be manufactured by press molding and a spherical object will not be illuminated with nearly uniform distribution of luminance.

The aspherical surface to be used in the illumination optical system according to the present invention has such a convex shape as to lower a radius of curvature of the aspherical surface from that of the reference sphere as portions of the aspherical surface are farther from the optical axis. Accordingly, a variation of size of the light source causes a variation in amounts of rays to travel to the marginal portions of the visual field or a variation of distribution of luminance at the marginal portions of the visual field with distribution of luminance kept unchanged around the center of the visual field. Consequently, the illumination optical system according to the present invention may be used to obtain illumination adequate for observation through various types of observation optical systems having field angles different from one another while being combined with light sources having various sizes.

Further, the second type of the illumination optical system for endoscopes according to the present invention has a fundamental composition, which is the same as that already described above, satisfies the relationship of h=f·sin θ and uses an aspherical surface satisfying the following condition (2):

$$\frac{0.6\,h}{\sqrt{n^2 \cdot f_1^2 - 0.6\,h^2} \; -f_1} \leq \frac{dF_{\sin\theta}\,(h)}{dh} \leq \frac{1.2\,h}{\sqrt{n^2 \cdot f_1^2 - 2h^2} \; -f_1} \quad (2)$$

That is to say, the second type of the illumination optical system for endoscopes according to the present invention comprises at least one lens component having at least one aspherical surface which has a shape satisfying the above-mentioned condition (2) and is designed as a curved surface lowering a radius of curvature thereon from that of the reference sphere thereof as portions of said aspherical surface are farther from the optical axis, and nearly satisfies the relationship of h=f·sin θ.

Objects to be observed through endoscopes are planar objects, spherical objects, tubular objects and other various objects as already described above. Therefore, it is important for an illumination optical system for endoscopes to provide adequate distribution of luminance an all the planar objects, spherical objects and tubular objects. For this reason, it is desirable that the illumination optical system nearly satisfies the relationship of h=f·sin θ.

When a spherical object and a tubular object are illuminated through the conventional illumination optical system as described above, distributions of relative luminance G(θ) and H(θ) are expressed as follows:

G(θ)=cos θ

H(θ)=cos θ sin³ θ

Figure 2:
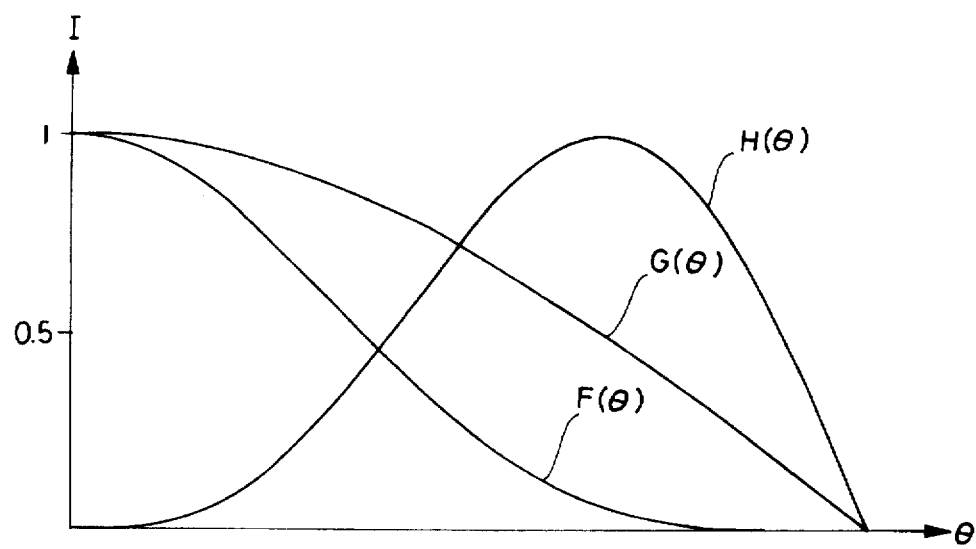
FIG. 2 shows graphs illustrating luminance distributions on objects which are illuminated through the optical system shown in FIG. 1.
Figure 3:
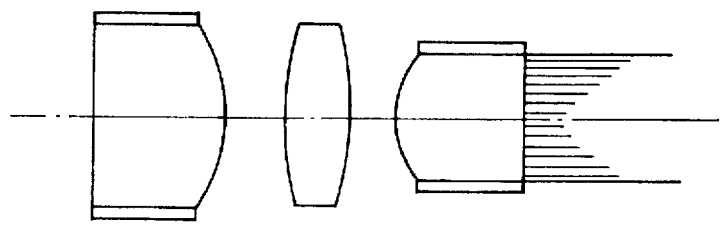
FIG. 3 and FIG. 4 show sectional views illustrating a composition of the other conventional illumination optical systems.
Figure 4:
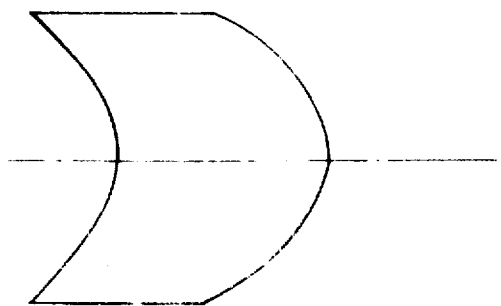
Figure 5:
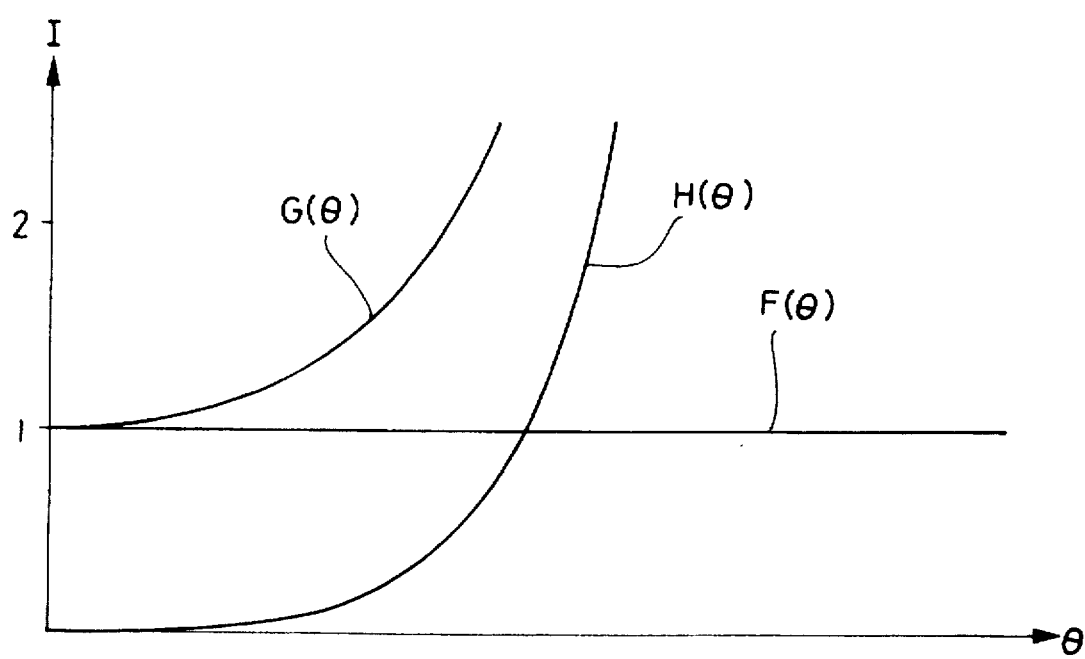
FIG. 5 shows graphs illustrating luminance distributions obtained with the illumination optical system shown in FIG. 4.
Figure 6:
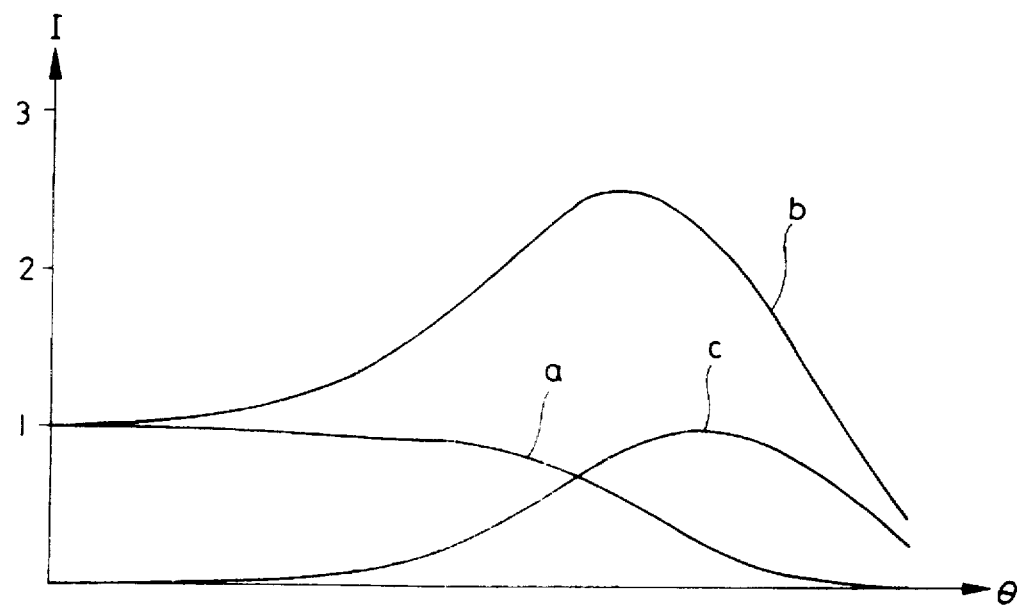
FIG. 6 shows graphs illustrating luminance distributions including influences due to total reflections in the illumination optical system shown in FIG. 4.
Figure 7:
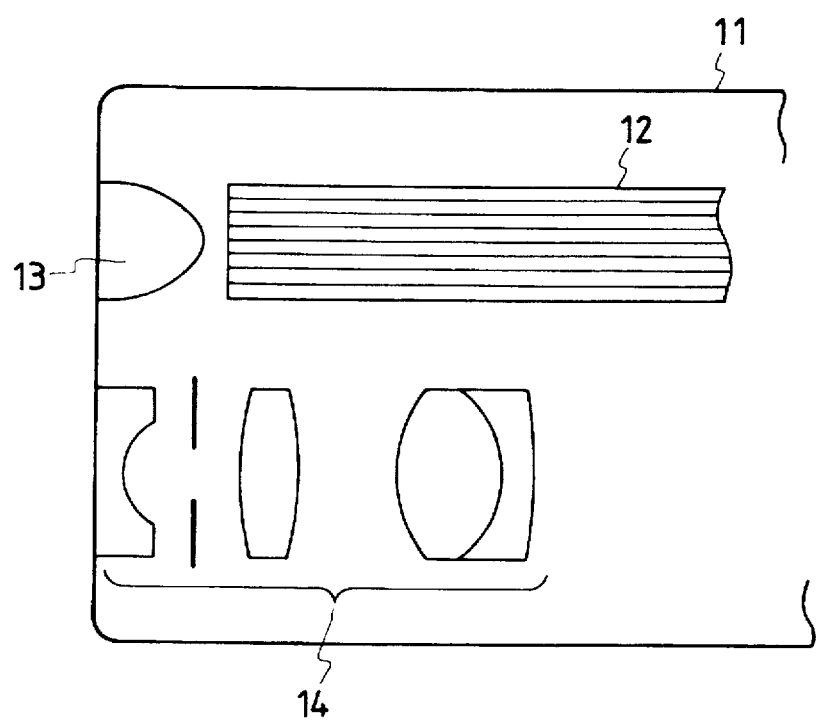
FIG. 7 shows a sectional view illustrating a composition of a distal end of an endoscope which uses the illumination optical system according to the present invention.

These distributions of luminance are visualized in FIG. 2. The curve G(θ) in FIG. 2 visualizes a fact that the distribution of luminance on the spherical object lowers light amount along the cos θ curve toward the marginal portions but poses no problem for practical use of the illumination optical system. Further, the curve H(θ) proves a fact that the distribution on the tubular object enhances luminance not abruptly on the marginal portions and is adequate for observation.

In order to obtain an illumination optical system which can provide the above-described distributions of luminance, comprises one positive lens component, has a field angle wide enough for observation through an observation optical system having a wide field angle exceeding 110° and can be composed of a small number of lens components, it is necessary to use at least one aspherical surface in the illumination optical system and configure the aspherical surface so as to have a curved shape which has a radius of curvature lower than the reference sphere thereof as portions of the aspherical surface are farther from the optical axis.

A shape of $F_{\sin\theta}(h)$ of an aspherical surface which is required for satisfying the relationship of h=f·sin θ in the illumination optical system shown in FIG. 10 is determined as described below:

A formula (xvi) mentioned below can be obtained from the above-mentioned formulae (vii), (viii), (ix), and the following formula (xv):

$$h = f \sin \theta \quad (xv)$$

$$\tan \omega = \frac{dF_{\sin\theta}\,(h)}{dh} \quad (xi)$$

$$\tan \omega = h / \sqrt{n^2 \cdot f^2 - h^2} \; -f \quad (xvi)$$

Further, the formula (xvii) shown below can be led from the formulae (xi) and (xvi):

$$\frac{dF_{\sin\theta}\,(h)}{dh} = \frac{h}{\sqrt{n^2 \cdot f^2 - h^2} \; -f} \quad (xvii)$$

On the basis of the formula (xvii), the function $F_{\sin\theta}(h)$ is transformed into the following formula (xviii):

$$F_{\sin\theta}\,(h) = \int \frac{h}{\sqrt{n^2 \cdot f^2 - h^2} \; -f} \, dh \quad (xviii)$$

Since the relationship between the height of the incident ray h and the angle of emergence θ is determined depending on the inclination of the aspherical surface in a case where the illumination optical system consists of a single lens component having a planar surface on the object side, it is sufficient that the formula (xvii) is satisfied by the illumination optical system which satisfies the formula (xv). The function expressed by the formula (xvii) means that the aspherical surface has a shape which has an inclination increased as h increases at a rate lower than that of a spherical surface which has the same focal length as that of the aspherical surface. In FIG. 11, the ordinate represents the angle of inclination, the abscissa designates h, the curves S, $AS_1$ and $AS_2$ inclinations of the aspherical surface used in the illumination optical system satisfying the relationship of h=f·sin θ and the aspherical surface used in the illumination optical system satisfying the relationship of h=f·θ respectively.

As is understood from the foregoing description, the conditions (2) define the relationship between the height of incident ray h and dF sin θ (H)/dh which represents an inclination at coordinates of (h, F sin θ(h)) on an aspherical surface so that the positive lens component having at least one aspherical surface nearly satisfies the formula (xv).

If the lower limit of the condition (2) is exceeded in the illumination optical system which comprises the positive lens component having the above-described aspherical surface, loss of light amounts will be increased due to too strong a refractive power of a lens surface other than the aspherical surface when such a surface is comprised in the illumination optical system. If the upper limit of the condition (2) is exceeded, in contrast, loss of light amounts will be increased due to too high a curvature on the reference sphere of the aspherical surface when a lens surface other than the aspherical surface has a refractive power and molding dies cannot be prepared with high precision when the aspherical surface is to be manufactured by press molding.

Further, for an illumination optical system which nearly satisfies the relationship of h=f·sin θ and the above-mentioned condition (2), it is preferable to satisfy the following condition (3):

$$n > 1.6 \qquad (3)$$

wherein the reference symbol n represents a refractive index of the lens component which has the aspherical surface.

The above-mentioned condition (3) defines the refractive power of the lens component having the aspherical surface. If the lower limit of the condition (3) is exceeded, the aspherical surface will have inclinations which are abruptly increased within a region where rays are incident on the aspherical surface at large heights and the lens component can hardly be manufactured with high precision. The condition (3) means that the lens component having the aspherical surface is to be made of glass material which has a relatively high refractive index for making it possible to perform illumination component.

As is understood from the foregoing description, favorable luminance distributions can be obtained on objects of various forms (for example, planar objects, spherical objects and tubular objects) with the first type of the illumination optical system according to the present invention which has the composition described above and nearly satisfies the relationship of $h=f\cdot\theta$. Similarly, favorable luminance distributions can be obtained on the objects of all forms with the second type of the illumination optical system which nearly satisfies the relationship of $h=f\cdot\sin\theta$ and comprises the lens component having a shape satisfying the condition (2). However, favorable luminance distributions are obtainable not only with the illumination optical systems of the types described above. Illumination optical systems which satisfies intermediate relationship of h versus $\theta$ between $h=f\cdot\theta$ and $h=f\sin\theta$ can also provide favorable luminance distributions. In case of the illumination optical system which satisfies the intermediate relationship of h versus $\theta$, it is desirable that the aspherical surface satisfies, on the basis of the conditions (1) and (2), the above-mentioned condition (4).

Figure 12:
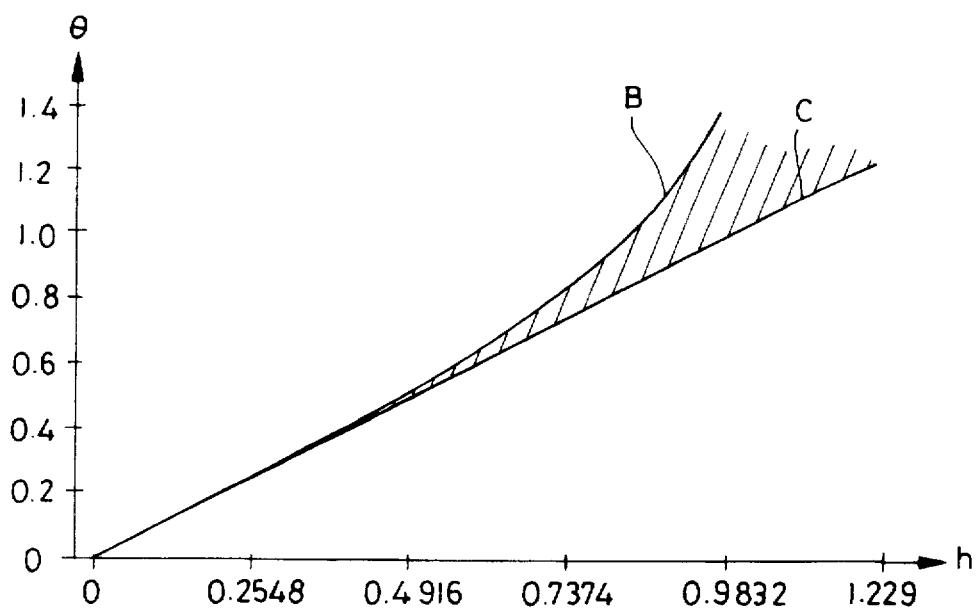
FIG. 12 shows a graph illustrating relationship between h and θ which is intermediate between h=f•θ and h=f•sinθ.

The illumination optical systems which satisfies the intermediate relationship of h versus $\theta$ between $h=f\cdot\theta$ and $h=f\sin\theta$ means illumination optical systems which have relationship between h and $\theta$ located within the slashed area between the curve B representing the relationship of $h=f\cdot\sin\theta$ and the curve C representing the relationship of $h=f\cdot\theta$ in FIG. 12. In case of the illumination optical systems which satisfy the relationship of h versus $\theta$ located between the curves B and C, and have the composition of the illumination optical system according to the present invention, the object of the present invention can be accomplished so far as aspherical surfaces have shapes satisfying the condition (4).

Figure 36:
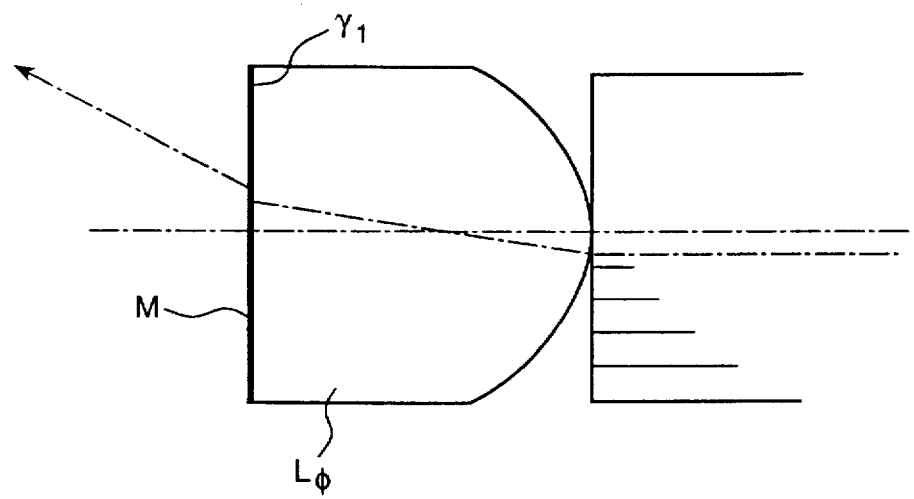
FIG. 36 illustrates a view of an example wherein the object side surface of the lens component is coated.

It is possible to reduce Fresnel's reflection and increase amounts of rays emerging from the illumination optical system by coating, with $MgF_2$, $SiO_2$ or a similar substance, the object side surface of the lens component disposed in the illumination optical system according to the present invention. It is desirable that the object side surface $r_1$ of the lens component $L_p$ is coated with, for example, $MgF_2$ as indicated by the reference symbol M in FIG. 36.

In case of observation through endoscopes, water drops may adhere to the object side surface of the lens component which is disposed on the object side in the illumination optical system. When water drops adhere to the object side surface, the luminance distribution will be degraded when illumination is performed through the illumination optical system to which the water drops are adhering. The coating on the lens component described above is desirable for preventing adhesion of water drops due to the repellent nature of the coating.

Figure 37:
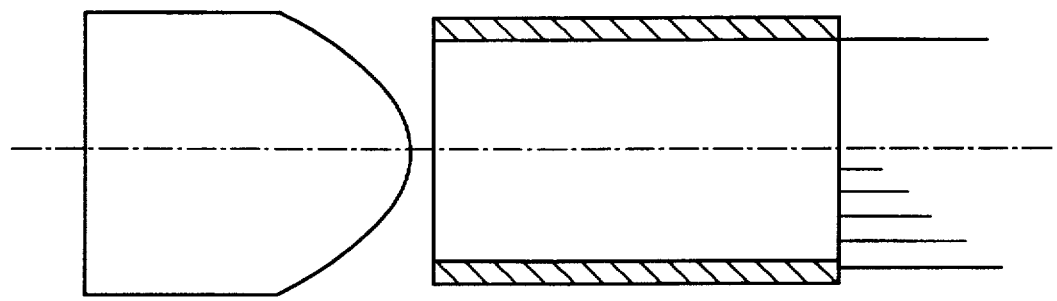
FIG. 37 shows a view of an example wherein a cylindrical reflecting mirror is disposed between an optical fiber bundle and the optical system.

Furthermore, when a light guide consisting of an optical fiber bundle is disposed on the side of incidence of the illumination optical system, an end surface of the optical fiber bundle does not glow uniformly but only cores of optical fibers glow. When an object is illuminated with a light bundle which emerges from the end surface of the optical fiber bundle and has passed through the positive lens component, an image of this end surface is projected directly onto a surface of the object, whereby only portions of the surface corresponding to the cores are illuminated brightly and form a mesh-like pattern on the object to constitute hindrance to observation of the object. For preventing the mesh-like pattern from being produced, it is sufficient to use an optical fiber bundle in which density of optical fibers is enhanced by melting the optical fibers as to adhere to one another. Alternately, it is possible to prevent the above-mentioned degradation of illuminating condition by disposing a cylindrical reflecting mirror having a reflecting inside surface (FIG. 37) or a single optical fiber between the optical fiber bundle and the illumination optical system according to the present invention.

The mesh-like non-uniformities described above are most noticeable when an image of an end surface of the optical fiber bundle is formed at an infinite distance. When the single optical fiber is to be disposed between the illumination optical system and the optical fiber bundle, it is desirable that the illumination optical system is configured so as to satisfy the following condition:

$$F_B < 0$$

wherein the reference symbol $F_B$ represents a distance as measured from a final surface of the illumination optical system as a whole, i.e., a surface nearest the light source, to a rear focal point of the illumination optical system as a whole which comprises, in place of the aspherical surface, the reference sphere of the aspherical surface. This distance is to be taken as positive when it is measured in the direction from the final surface toward the light source or negative when it is measured in the direction from the final surface toward the object side.

The lens component having the aspherical surface which is to be used in the illumination optical system according to the present invention is ordinarily manufactured by press molding and molding die has a concave surface when the lens component having the aspherical surface is a convex lens component. For this reason, when a small lens component, which is to be used for endoscopes is to be manufactured, a whetstone for polishing the molding die may interfere with the inside surface of the molding die, thereby disabling the polishing, or producing stain and deformation at a central portion of the lens component during the press molding.

The lens component which is to be used in the illumination optical system can be manufactured easier when the refractive power of the aspherical surface is weakened by designing the object side surface of the lens component as a convex or concave surface, or by selecting a glass material having a higher refractive index for the lens component so as to lower a radius of curvature on the surface. It is desirable that the refractive index n of the glass material satisfies the following condition:

$$n > 1.6$$

When the surfaces disposed in the conventional illumination optical system illustrated in FIG. 1 are represented by $r_1$, $r_2$, $r_3$ and $r_4$ in order from the object side, the surface $r_2$ has a refractive power which is nearly equal to that of the surfaces $r_3$. The relation between the refractive powers is selected for reducing amounts of rays totally reflected by the surface $r_2$ and $r_3$ in an illumination optical system which is assumed to be composed only of spherical lens components for obtaining a visual field as large as possible.

A spherical lens surface has a refractive power that is strengthened as portions of the lens surface are farther from the optical axis. For this reason, it is impossible to configure the surface $r_3$ so as to have too strong a refractive power for reducing amounts of totally reflected rays which have large heights of incidence. On the other hand, it is necessary for the surface $r_2$ to have a strong refractive power. However, it is impossible to select too strong a refractive power for the surface $r_2$ since such a strong power of the surface $r_2$ increases amounts of rays to be totally reflected by the surface $r_1$. Therefore, the refractive powers of the surfaces $r_2$ and $r_3$ are selected so as to be equal to each other for proper balance between the luminance distribution and the light amounts.

When the illumination optical system according to the present invention is configured so as to comprise, in order from the object side, a spherical surface $r_1'$, an aspherical surface $r_2'$, a spherical surface $r_3$ and a spherical surface $r_4$ by interposing a convex lens component between the lens component having the aspherical surface and the light source amounts of rays which are to be totally reflected by the surface $r_1$ are not increased so much even by strengthening the refractive power of the surface $r_2$ for obtaining luminance distribution at a wide field angle since the refractive power of the surface $r_2$ is not strengthened so must toward the marginal portion thereof as compared with that of the reference sphere thereof. For this reason, it is unnecessary to strengthen the refractive power of the surface $r_3$ and it is possible to reduce the amounts of the rays which are to be totally reflected by the surface $r_3$.

When the convex lens component is interposed between the aspherical surface and the light source in the illumination optical system according to the present invention, it is desirable that the following relationship establishes between the refractive power $\phi_3$ of the object side surface $r_3$ of this convex lens component and the refractive power $\phi_2$ of the reference sphere which is adopted for the aspherical lens component in place of the aspherical surface:

$$\phi_3 < \phi_2$$

By interposing the convex lens component between the lens component having the aspherical surface and the light source in the illumination optical system according to the present invention as described above, it is possible not only to make the aspherical surface more easily shaped but also to allow rays which would otherwise fall outside an effective diameter of the surface $r_2'$ to be incident onto the surface $r_2$ owing to a function of the surface $r_2$ thereby increasing amounts of rays emerging from the illumination optical system.

When the convex lens component is interposed as described above, it is sufficient for the aspherical surface to have a shape which has curvature that becomes lower than that on the reference sphere as portions of the aspherical surface are farther from the optical axis. By using an aspherical surface having the shape described above, it is possible, even when the convex lens component is interposed as described above, to configure the illumination optical system so as to nearly satisfy the relationship of $h = f \cdot \theta$ or $h = f \cdot \sin \theta$, to assure little loss of light amounts, to use the illumination optical system in combination with endoscopes comprising wide angle observation optical systems, and provide nearly uniform luminance distributions for spherical objects as well as adequate illumination intensity distributions for planar objects and tubular objects.

In case of the illumination optical system having the convex lens component, rays which emerge at an angle of emergence of $\theta°$ from the light source and have the highest intensity are generally concentrated nearly on a point. In case of a medical endoscope, for example, the concentrated rays may burn human bodies when the above-mentioned point is located outside the object side surface of the illumination optical system. Further, in case of an industrial endoscope, combustibles may be inflamed when such materials are present near a location to be observed through the endoscope. To prevent such risks, it is desirable for the illumination optical system according to the present invention to satisfy the condition mentioned below:

$$F_F > 0$$

wherein the reference symbol $F_F$ represents a distance as measured from the object side surface of the illumination optical system to a front focal point of the illumination optical system in which the aspherical surface is replaced with the reference sphere thereof. (This distance is to be taken as negative when it is measured toward the object side or positive when it is measured toward the light source.)

Further, in order to configure the illumination optical system according to the present invention so as to have luminance distribution with a field angle of 110° or wider and assure little loss of light amounts, it is desirable that rays which are emitted from the light source in parallel with the optical axis and have the largest height are not totally reflected by the object side surface of the illumination optical system or do not fall on the outer circumference of the lens component.

When a single optical fiber or a positive lens component is interposed between the lens component having the aspherical surface and the light source as described above, an image of the object side surface of the single optical fiber or the positive lens component may be formed on an object illuminated through the illumination optical system. When the image of the object side surface is formed as described above, an image of contamination on the surface is projected onto the object and constitutes a cause for non-uniform illumination.

In order to be free from this defect, it is desirable for the illumination optical system to satisfy the condition mentioned below:

$$0 \leq y < f_B$$

wherein the reference symbol $f_B$ represents a distance as measured from the light source side surface of the lens component having the aspherical surface to a rear focal point of the lens component having the aspherical surface and the reference symbol y designates a distance as measured from the light source side surface of the lens component having the aspherical surface to the object side surface of the above-mentioned positive lens component. (These distances are to be taken as positive when they are measured toward the light source.)

Now, the illumination optical system for endoscopes according to the present invention will be described in more detail with reference to the preferred embodiments illustrated in the accompanying drawings:

Embodiment 1

$r_1 = \infty$      $ER_1 = 1.09$
$\quad d_1 = 2.2 \quad n_1 = 1.80518 \quad v_1 = 25.43$
$r_2 = -0.8049$ (aspherical surface)      $ER_2 = 1.09$
aspherical surface coefficient
$\quad P = -0.0161, E = -0.41668 \times 10^{-1}$
$\quad f = f_1 = 1, D = 1.07, F_F = 0.219$ Embodiment 2

$r_1 = \infty$      $ER_1 = 1.3$
$\quad d_1 = 2.94 \quad n_1 = 1.78472 \quad v_1 = 25.71$
$r_2 = -0.7849$ (aspherical surface)      $ER_2 = 1.3$
$\quad d_2 = 0$
$r_3 = \infty$      $ER_3 = 1.12$
$\quad d_3 = 4 \quad n_3 = 1.72825 \quad v_3 = 28.46$ (single optical fiber)
$r_4 = \infty$      $ER_4 = 1.12$
aspherical surface coefficient
$\quad P = -0.7666, E = -0.79106 \times 10^{-1}, F = -0.36519,$
$\quad G = 0.3577, H = 0.30246 \times 10^{-1}, I = -0.15118,$
$\quad J = 0.44378 \times 10^{-2}, K = 0.23603 \times 10^{-1},$
$\quad L = 0.18313 \times 10^{-1}, M = -0.10802 \times 10^{-1}$
$\quad f = f_1 = 1, D = 1.09, F_F = 0.647, f_B = -1.314$ Embodiment 3

$r_1 = \infty$      $ER_1 = 1.47$
$\quad d_1 = 3.3 \quad n_1 = 1.78472 \quad v_1 = 25.71$
$r_2 = -1.4379$ (aspherical surface)      $ER_2 = 1.47$
$\quad d_2 = 0.13$
$r_3 = 4.7059$      $ER_3 = 1.27$
$\quad d_3 = 4.5 \quad n_3 = 1.72825 \quad v_3 = 28.46$ (single optical fiber)
$r_4 = \infty$      $ER_4 = 1.27$
aspherical surface coefficient
$\quad P = 0.75, B = -0.20238, E = -0.92935 \times 10^{-3},$
$\quad F = 0.32499 \times 10^{-1}, f = 1, f_1 = 1.158,$
$\quad f_B = -1.717, D = 1.23, F_F = 0.87, \phi_2 = 0.863,$
$\quad \phi_3 = 0.155$ Embodiment 4

$r_1 = -4.635$      $ER_1 = 1.3$
$\quad d_1 = 2.94 \quad n_1 = 1.78472 \quad v_1 = 25.71$
$r_2 = -0.8581$ (aspherical surface)      $ER_2 = 1.3$
aspherical surface coefficient
$\quad P = -0.8381, E = -0.56574 \times 10^{-1}, F = -0.35164,$
$\quad G = 0.35104, H = 0.26764 \times 10^{-1}, I = -0.15239,$
$\quad J = 0.3674 \times 10^{-2}, K = 0.23462 \times 10^{-1},$
$\quad L = 0.18432 \times 10^{-1}, M = -0.10549 \times 10^{-1}$
$\quad f = f_1 = 1, D = 1.09, F_F = 0.506$ Embodiment 5

$r_1 = \infty$      $ER_1 = 1.18$
$\quad d_1 = 2.66 \quad n_1 = 1.78472 \quad v_1 = 25.71$
$r_2 = -0.7847$ (aspherical surface)      $ER_2 = 1.18$
aspherical surface coefficient
$\quad P = 0.2394, E = -0.67356 \times 10^{-1}, F = 0.3223 \times 10^{-1}$
$\quad f = f_1 = 1, D = 1, F_F = 0.489$ Embodiment 6

$r_1 = \infty$      $ER_1 = 0.93$
$\quad d_1 = 2.3 \quad n_1 = 1.78472 \quad v_1 = 25.71$
$r_2 = -0.7848$ (aspherical surface)      $ER_2 = 0.93$
aspherical surface coefficient
$\quad P = 0.3637, E = -0.27091 \times 10^{-1}$
$\quad f = 1, D = 0.91, F_F = 0.289$ Embodiment 7

$r_1 = \infty$      $ER_1 = 1.13$
$\quad d_1 = 2.2 \quad n_1 = 1.78472 \quad v_1 = 25.71$
$r_2 = -0.7849$ (aspherical surface)      $ER_2 = 1.13$
$\quad d_2 = 0$
$r_3 = \infty$      $ER_3 = 1$
$\quad d_3 = 3.4 \quad n_3 = 1.72825 \quad v_3 = 28.46$ (single optical fiber)
$r_4 = \infty$      $ER_4 = 1$
aspherical surface coefficient
$\quad P = 0.3279, E = -0.48352 \times 10^{-1}, F = 0.59201 \times 10^{-1}$
$\quad f = f_1 = 1, D = 0.837, F = 0.232, f_B = -0.967$ Embodiment 8

$r_1 = \infty$      $ER_1 = 1$
$\quad d_1 = 2.12 \quad n_1 = 1.78472 \quad v_1 = 25.71$
$r_2 = -1.028$ (aspherical surface)      $ER_2 = 1$
$\quad d_2 = 0.1$
$r_3 = 2.8475$      $ER_3 = 0.9$
$\quad d_3 = 3.2 \quad n_3 = 1.72825 \quad v_3 = 28.46$ (single optical fiber)
$r_4 = \infty$      $ER_4 = 0.945$
aspherical surface coefficient
$\quad P = 0.65, E = -0.10254, F = -0.1439, G = -0.23$
$\quad f = 1, D = 0.9, F_F = 0.219, F_B = -0.939,$
$\quad \phi_2 = 0.763, \phi_3 = 0.256, f_1 = f_B = 1.310$ Embodiment 9

$r_1 = -2.0956$      $ER_1 = 0.9$
$\quad d_1 = 2.35 \quad n_1 = 1.78472 \quad v_1 = 25.71$
$r_2 = -0.852$ (aspherical surface)      $ER_2 = 0.9$
aspherical surface coefficient
$\quad P = 0.4577, E = -0.67478 \times 10^{-3}, F = -0.1018 \times 10^{-2}$
$\quad f = f_1 = 1, D = 0.79, F_F = 0.213, F_B = 1.492$ wherein the reference symbols $r_1, r_2, \ldots$ represent radii of curvature on the respective lens components, the reference symbols $d_1, d_2, \ldots$ designate thicknesses of the respective lens components and airspaces reserved therebetween, the reference symbols $n_1, n_2, \ldots$ denote refractive indices of the respective lens components, the reference symbol $v_1, v_2, \ldots$ denote Abbe's numbers of the respective lens components, the reference symbols $\phi_2, \phi_3$ represent refractive powers of the lens surfaces $r_2$ and $r_3$ respectively, and the reference symbols $ER_1$ and $ER_2$ designate effective radii of the respective lens surfaces.

Figure 13:
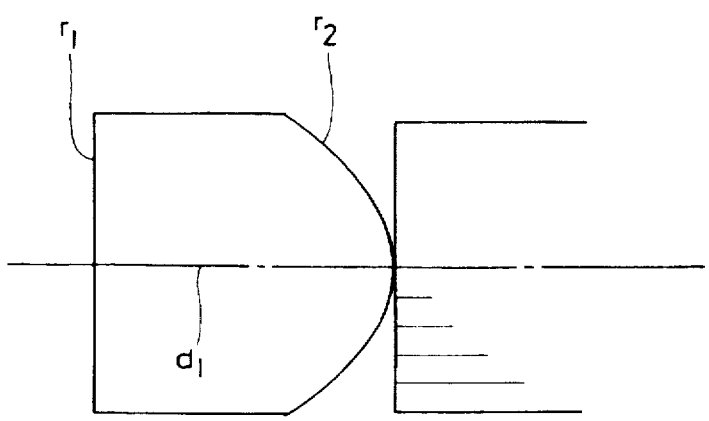
FIG. 13 through FIG. 21 show sectional views illustrating compositions of first through ninth embodiments of the illumination optical system for endoscopes according to the present invention.
Figure 22:
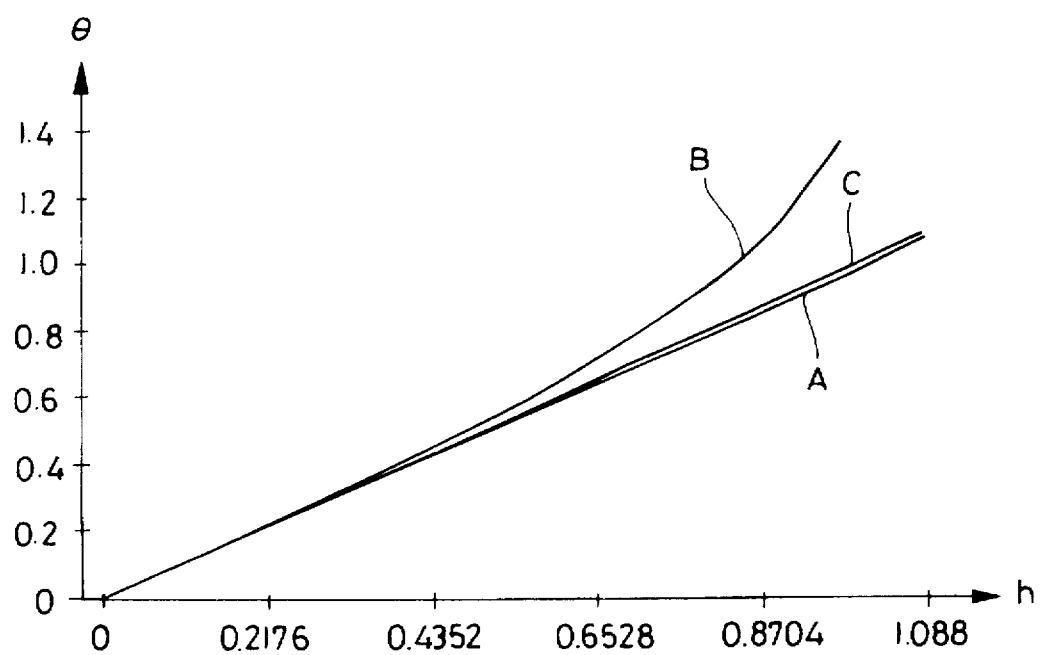
FIG. 22 shows graphs illustrating the relationship between h and θ in the first embodiment of the present invention.
Figure 23:
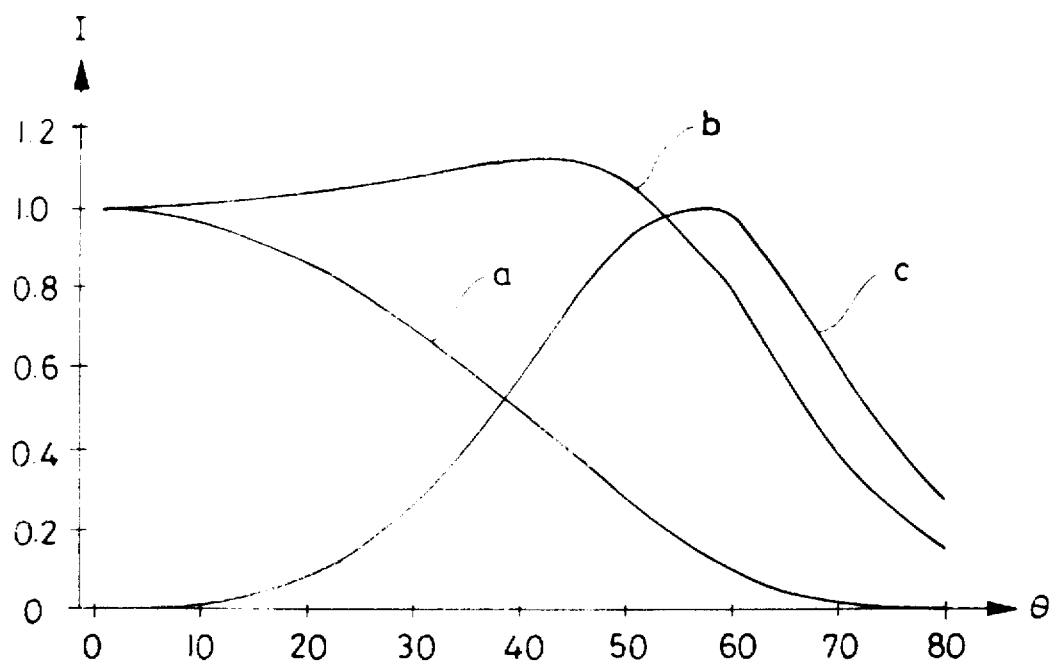
FIG. 23 shows graphs illustrating luminance distributions obtained with the first embodiment of the present invention.

The first embodiment is an illumination optical system which has a composition illustrated in FIG. 13 and satisfies the relationship of $h=f\cdot\theta$ as shown in FIG. 22. The first embodiment provides luminance distribution shown in FIG. 23 which permits observation at an observation field angle up to approximately 150°.

Figure 14:
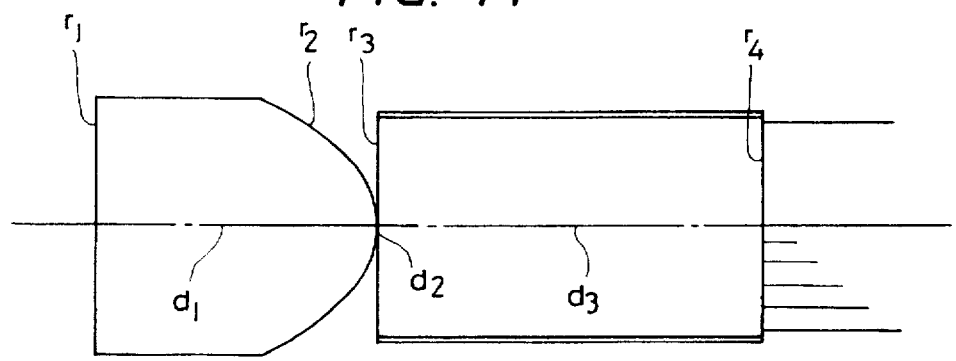
Figure 24:
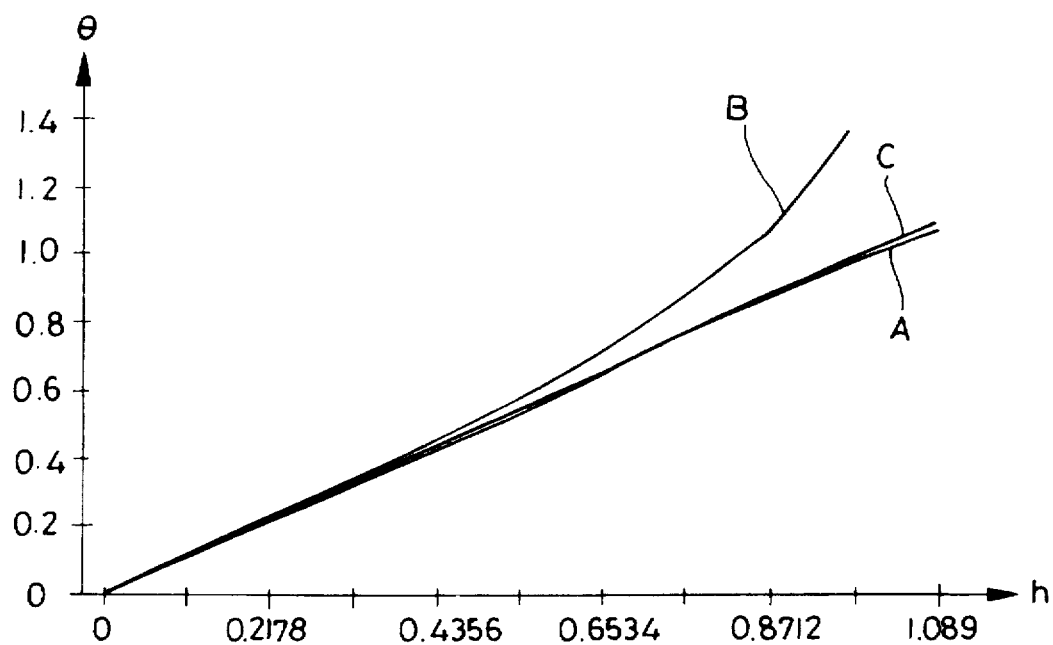
FIG. 24 shows graphs illustrating relationship between h and θ in the second embodiment of the present invention.
Figure 25:
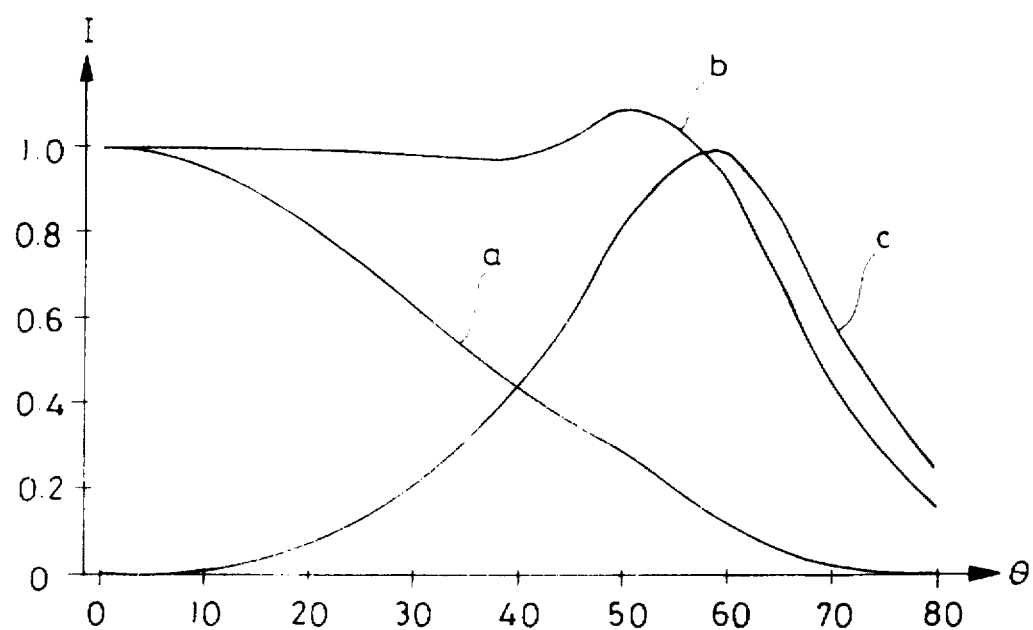
FIG. 25 shows graphs illustrating luminance distributions obtained with the second embodiment of the present invention.

The second embodiment has a composition illustrated in FIG. 14, wherein a single optical fiber is interposed between the lens component having an aspherical surface and the light source. The second embodiment has the relationship between height h of incident ray and angle of emergence $\theta$ illustrated in FIG. 24, or nearly satisfies $h=f\cdot\theta$. The second embodiment provides luminance distribution as shown in FIG. 25 which is sufficient for allowing observation at field angles up to approximately 150°. Further, the second embodiment uses the single optical fiber which is interposed between the lens component having the aspherical surface and the light source so that the mesh-like non-uniformities can hardly be produced as an image of the end surface of the optical fiber bundle and the luminance distribution is scarcely changed by varying a size of the light source. In order to prevent the luminance distribution from being varied by changing the size of the light source, it is desirable the following relationship established between a radius d of the core of the single optical fiber and a length L thereof:

$$2d<L$$

Figure 15:
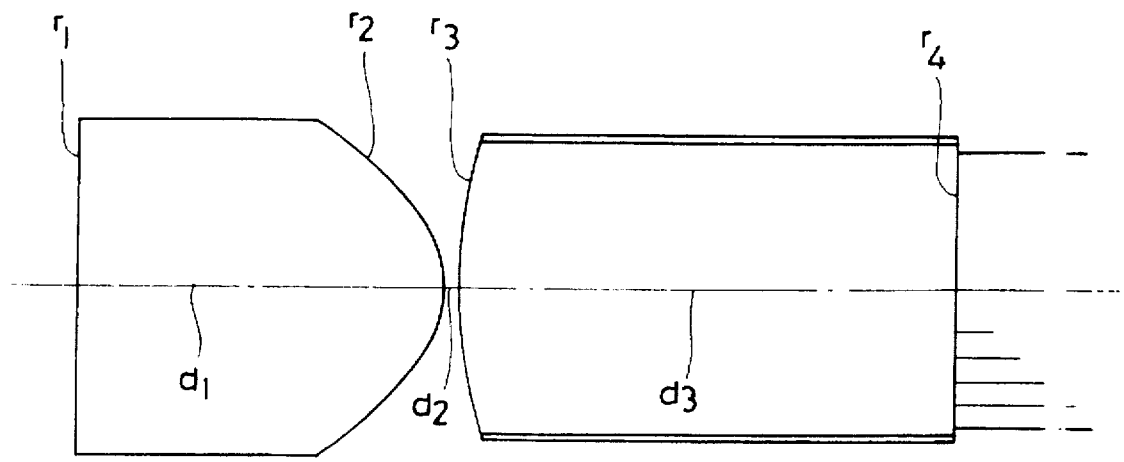
Figure 26:
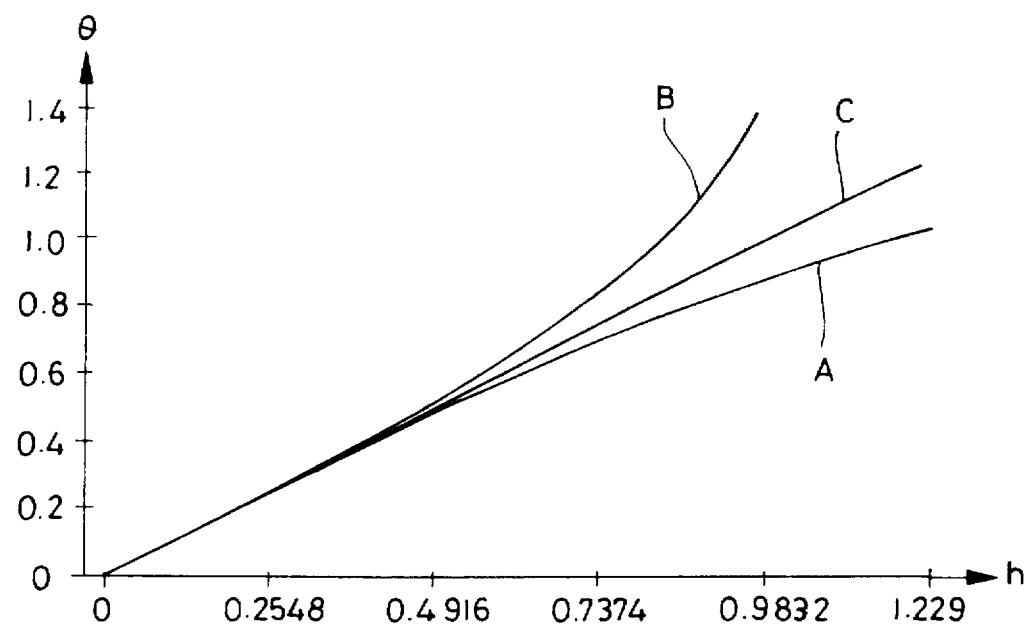
FIG. 26 shows graphs illustrating relationships between h and θ in the third embodiment.
Figure 27:
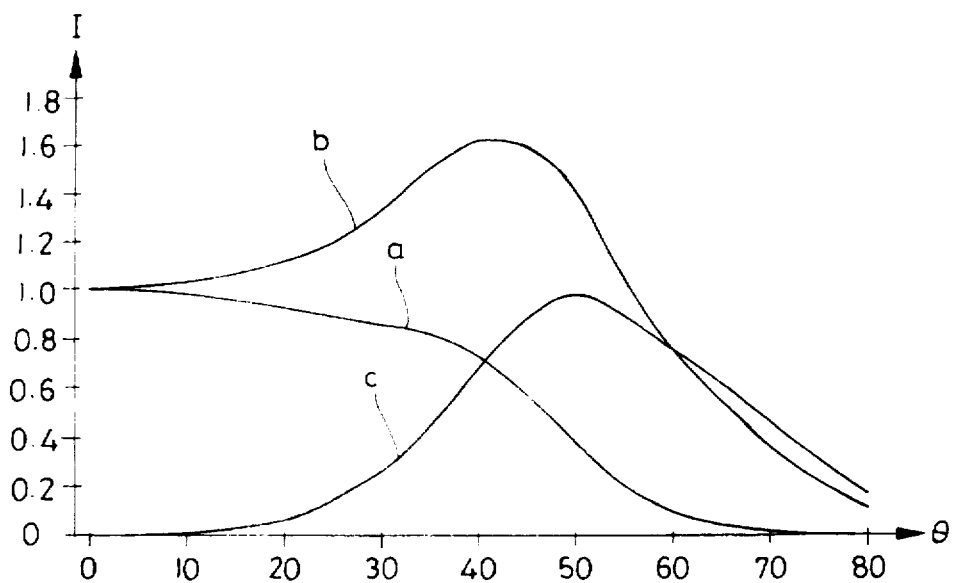
FIG. 27 shows graphs illustrating luminance distributions obtained with the third embodiment of the present invention.

The third embodiment has a composition illustrated in FIG. 15 wherein a single optical fiber having a shape of a convex lens component is interposed between the lens component having the aspherical surface and the light source. The third embodiment has relationship between the height h of incident ray and the angle of emergence $\theta$ shown in FIG. 26, or nearly satisfies the relationship of $h=f\cdot\theta$. However, the third embodiment allows ring-shaped non-uniformities to be produced slightly on spherical objects as illustrated in FIG. 27 due to a fact that the relationship between h and $\theta$ of the third embodiment is deviates from $h=f\cdot\theta$ toward $h=f\cdot\tan\theta$. These ring-shaped non-uniformities pose no problem for practical use of the third embodiment.

The third embodiment provides luminance distribution which is sufficient for observation at an observation field angle of approximately 150°. Further, the third embodiment can prevent the mesh-like pattern from being produced due to an end surface of an optical fiber bundle owing to the single optical fiber which has the shape of a convex lens component and is interposed between the aspherical surface and the light source. The luminance distribution provided by the third embodiment is not varied by changing a size of the light source. Furthermore, the aspherical surface adopted in the third embodiment has a shape which can easily be formed.

Figure 16:
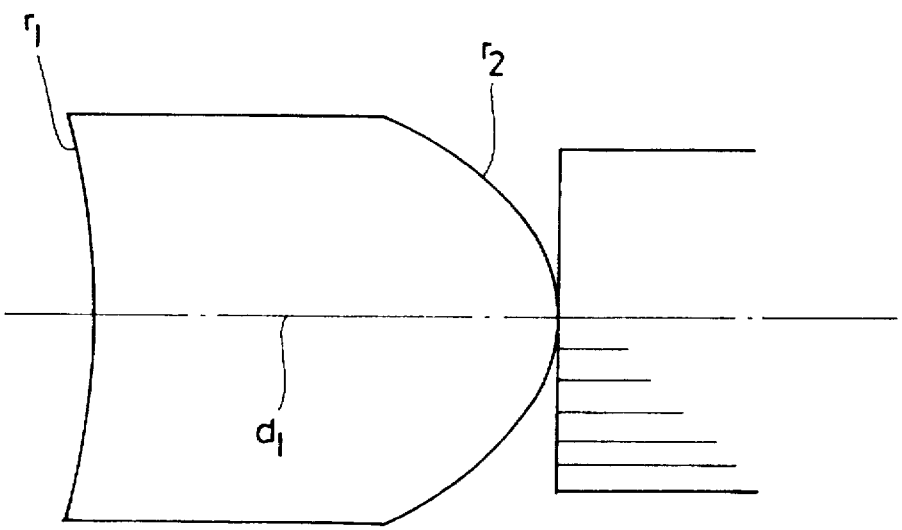
Figure 28:
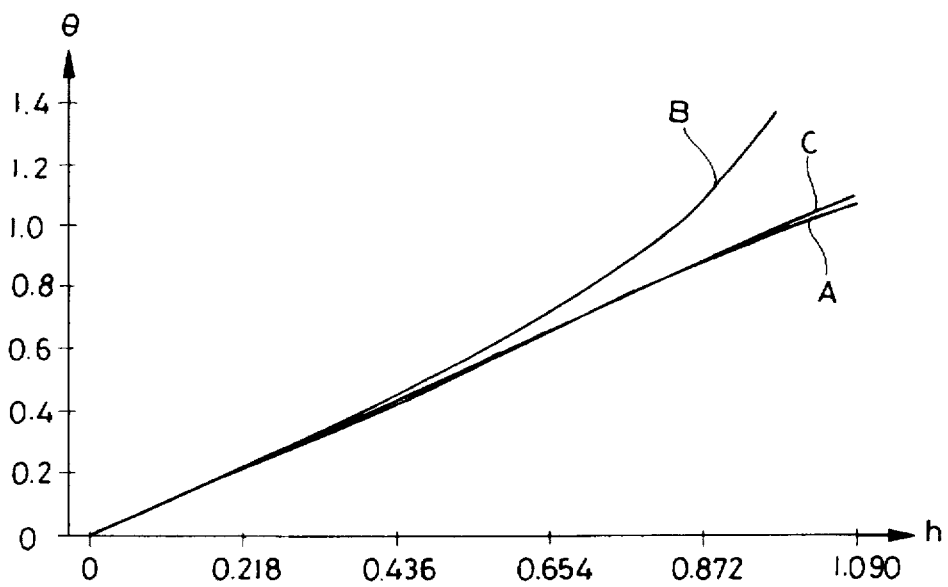
FIG. 28 shows graphs illustrating relationships between h and θ in the fourth embodiment of the present invention.
Figure 29:
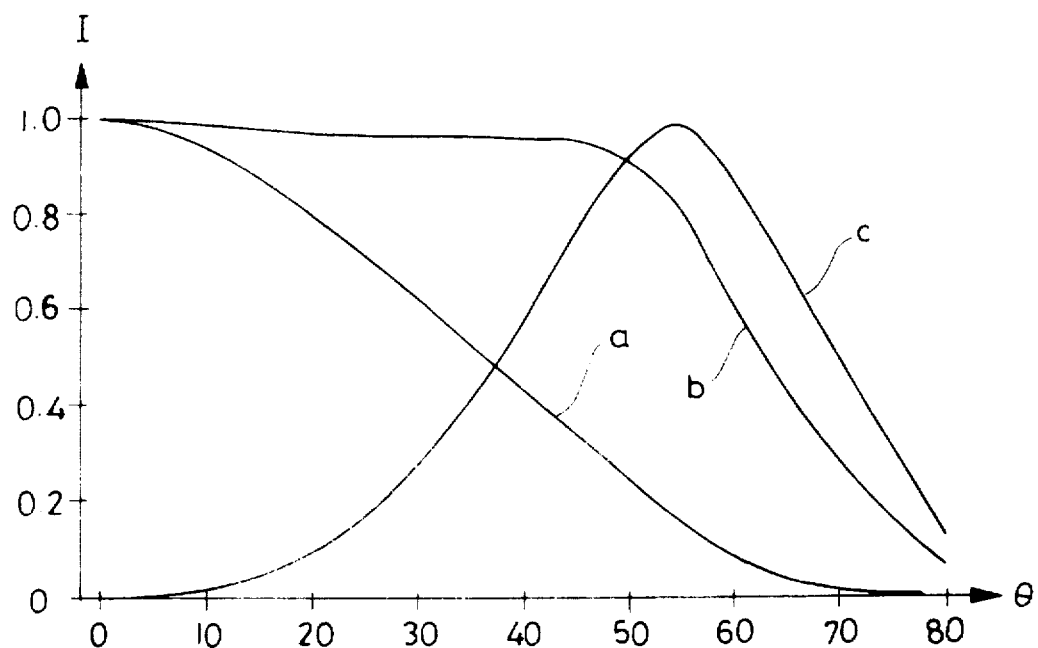
FIG. 29 shows graphs illustrating luminance distributions obtained with the fourth embodiment of the present invention.

The fourth embodiment has a composition illustrated in FIG. 16, wherein the optical system is composed only of an aspherical lens component having a concave surface on the object side. The fourth embodiment has the relationship between the height h of incident ray and the angle of emergence θ and nearly satisfies h=f·θ as shown in FIG. 28. Since the aspherical lens component used in the fourth embodiment has the concave surface on the object side, the lens component can be manufactured more easily than an aspherical lens component which has a planar surface on the object side. Further, the fourth embodiment provides an luminance distribution which permits obtaining an observation visual field having a field angle up to approximately 150°.

Figure 17:
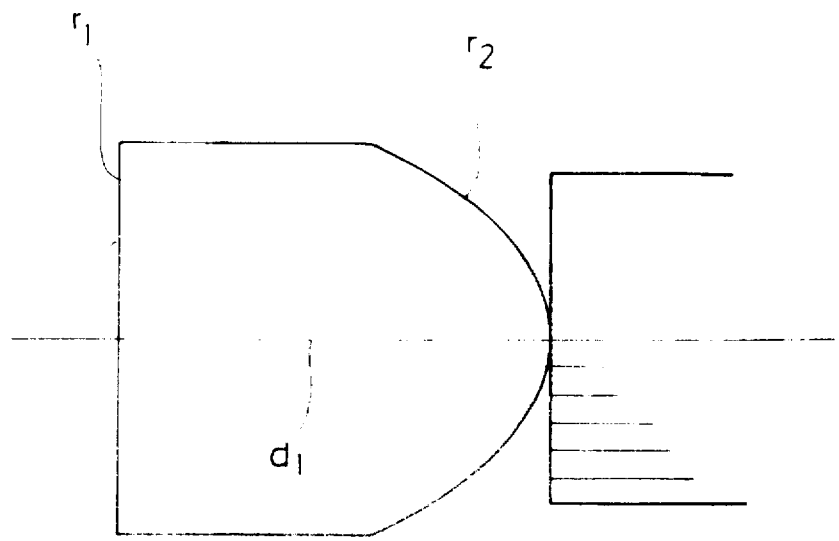
Figure 30:
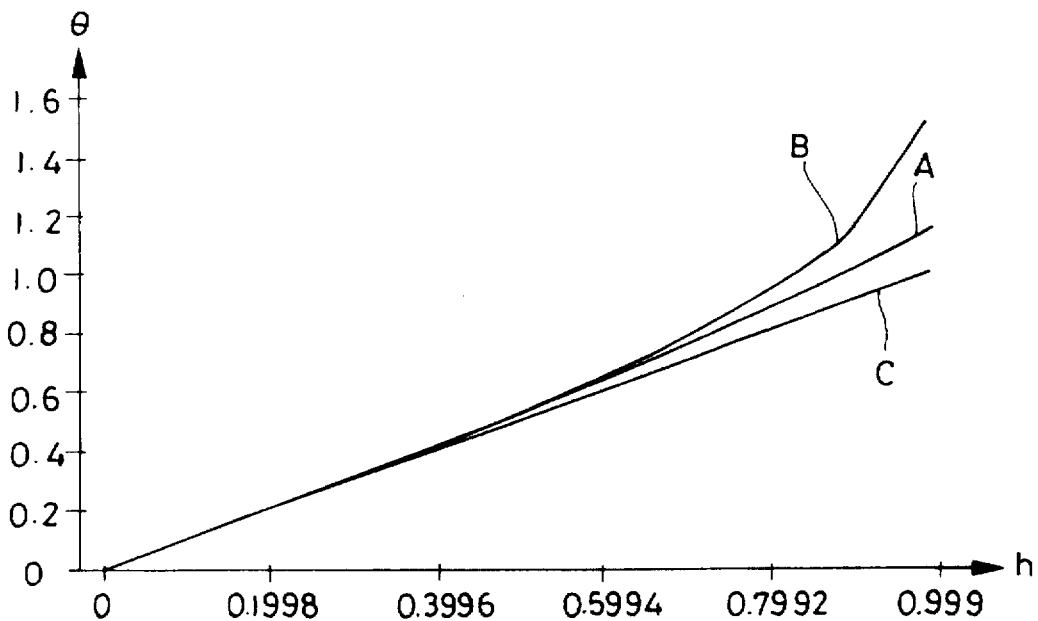
FIG. 30 shows graphs illustrating relationship between h and θ in the fifth embodiment of the present invention.
Figure 31:
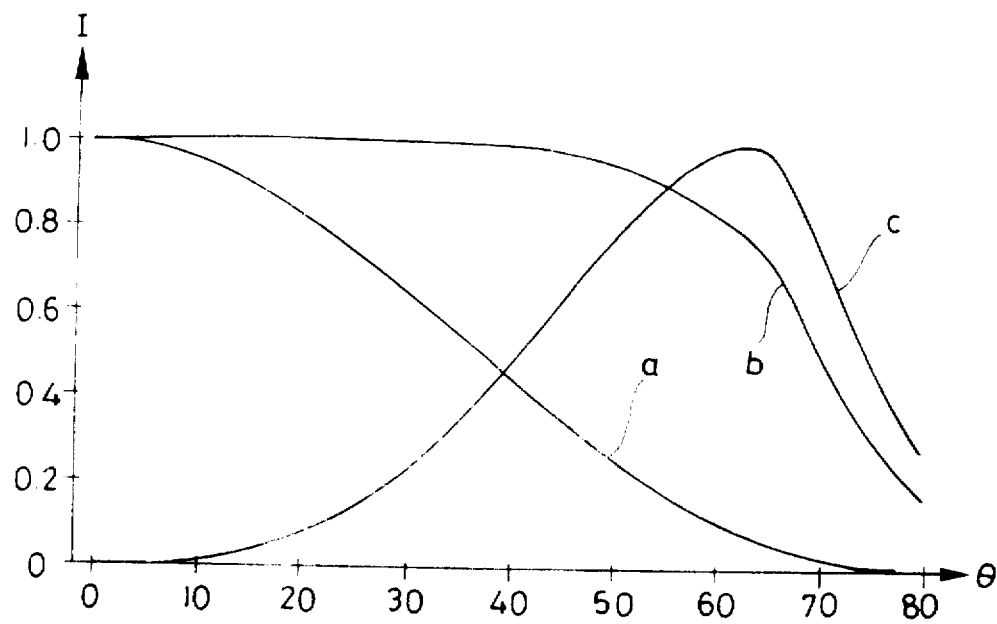
FIG. 31 shows graphs illustrating luminance distributions obtained with the fifth embodiment of the present invention.

The fifth embodiment has a composition illustrated in FIG. 17, wherein the optical system consists only of a single aspherical lens component. The fifth embodiment nearly satisfies h=f·θ as the relationship between the height h of the incident ray and the angle of emergence θ as illustrated in FIG. 30.

However, since this relationship deviates from h=f·θ toward h=f·sin θ, luminance at the marginal portions in the luminance distribution provided by the fifth embodiment is lower than that in the luminance distribution provided by the first embodiment illustrated in FIG. 13, or the fifth embodiment provides a luminance distribution which is more uniform than that provided by the first embodiment. The fifth embodiment provides a luminance distribution which is usable with an observation optical system having a field angle of approximately 150°.

The first through the fifth embodiments described above nearly satisfy the relationship of h=f·θ as well as the condition (1).

Figure 18:
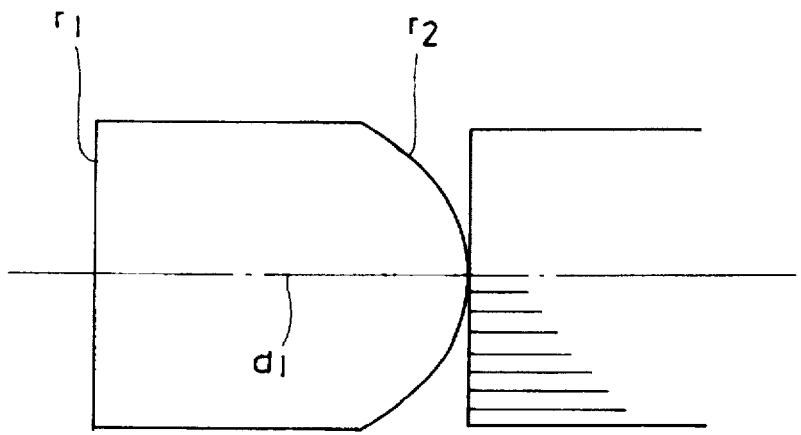
Figure 32:
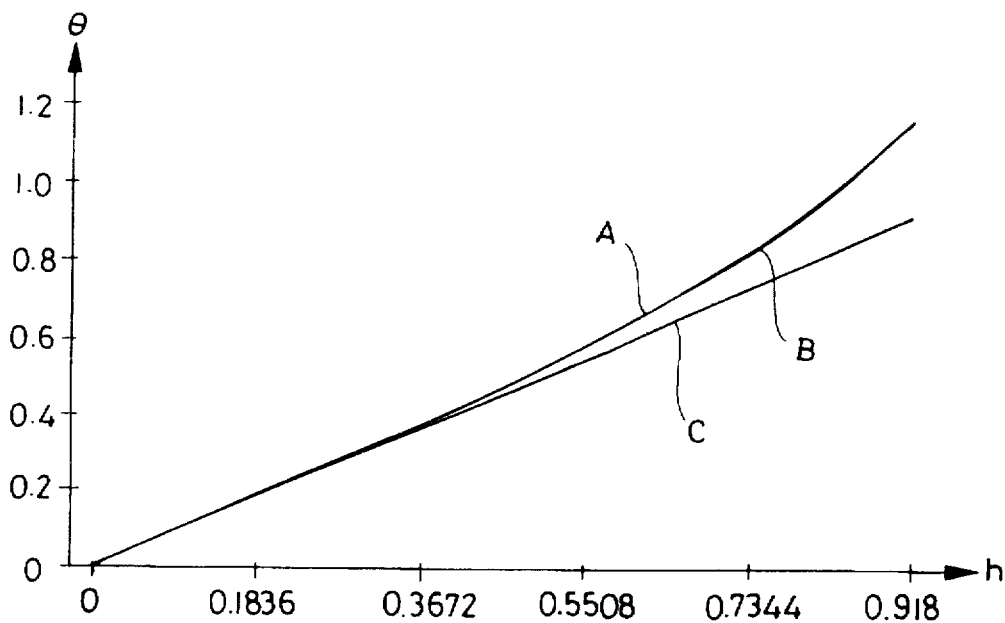
FIG. 32 through FIG. 35 show graphs illustrating relationship between h and θ in the sixth through ninth embodiments respectively of the present invention.
Figure 33:
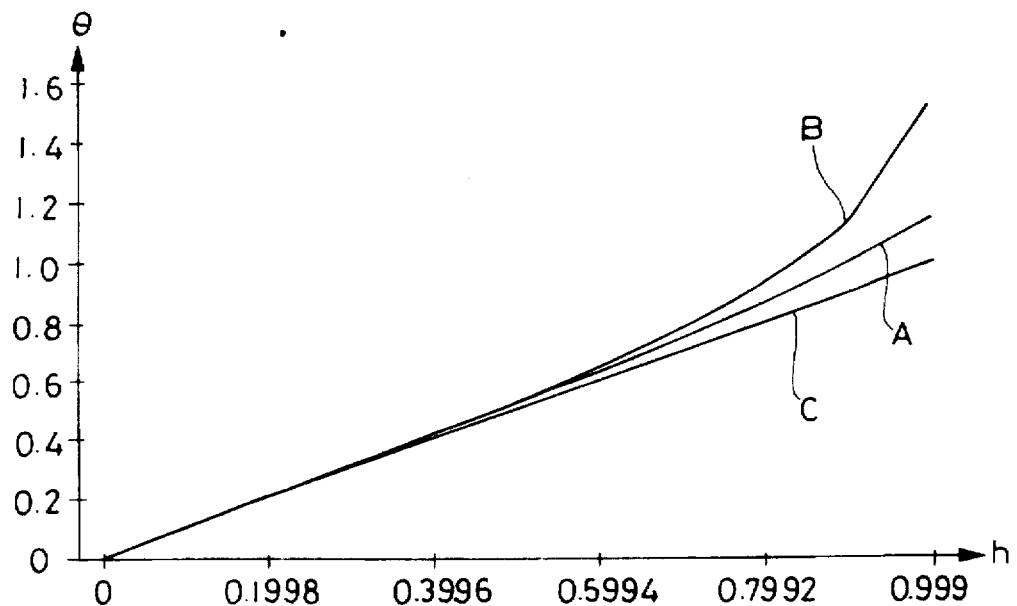
Figure 34:
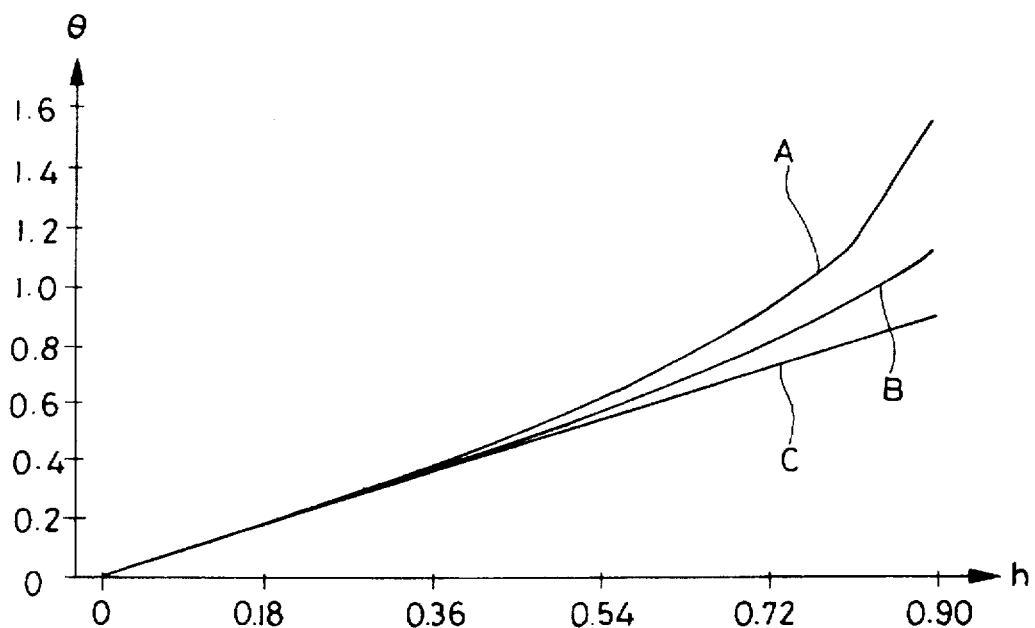

The sixth embodiment has a composition illustrated in FIG. 18, wherein the optical system consists of a single lens component having an aspherical surface. The sixth embodiment has relationship between the height h of the incident ray and the angle of emergence θ which nearly satisfies h=f·sin θ as shown in FIG. 32. The sixth embodiment is compatible with an observation optical system which has a field angle of approximately 150°.

Figure 19:
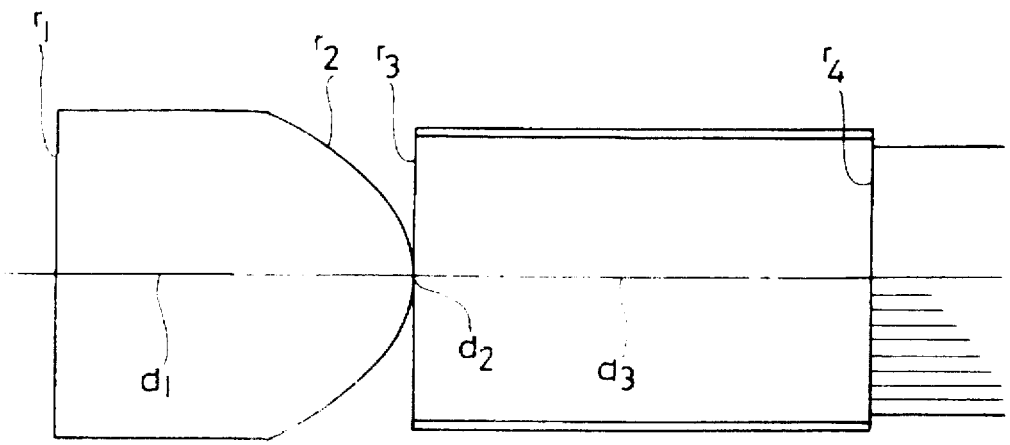

The seventh embodiment has a composition illustrated in FIG. 19, wherein a single optical fiber is disposed between the lens component having an aspherical surface and the light source. Owing to this single optical fiber, the mesh-like patterns can hardly be produced on an image of an end surface of an optical fiber bundle and preventing the luminance distribution from being substantially varied by changing a size of the light source. In order that the illumination intensity distribution is not varied by changing the size of the light source, it is desirable that the following condition is satisfied as already described above:

2d<L

The seventh embodiment also may be used for observation through an observation optical system which has a field angle of approximately 150°.

Figure 20:
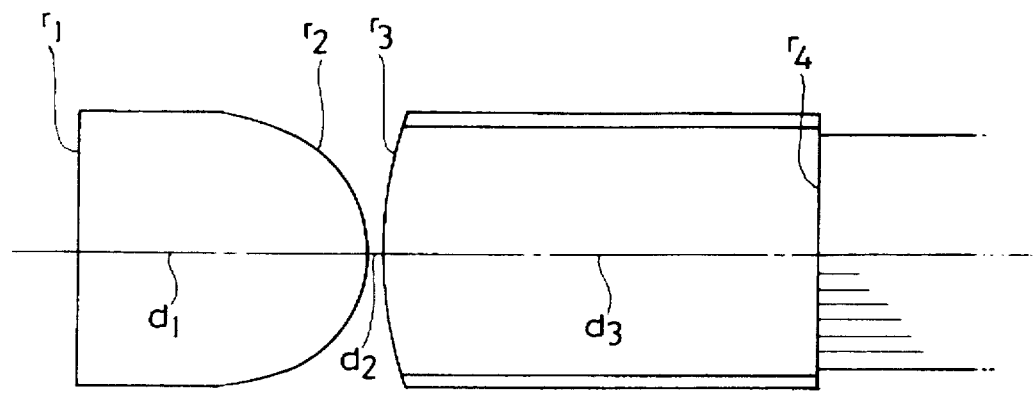

The eighth embodiment has a composition illustrated in FIG. 20, wherein a single optical fiber having a shape of a convex lens component is interposed between the positive lens component having an aspherical surface and the light source. The eighth embodiment has the relationship between the height h of incident ray and the angle of emergence θ which is illustrated in FIG. 24. Merits similar to those of the second embodiment can be obtained by interposing the single optical fiber in the eighth embodiment. Further, by configuring the single optical fiber so as to have a convex surface, it is possible to increase amounts of rays emerging from the illumination optical system, weaken the refractive power of the aspherical surface and facilitate manufacturing of the aspherical lens component. The eighth embodiment is also usable for observation through an observation optical system which has a field angle of approximately 150°.

Figure 21:
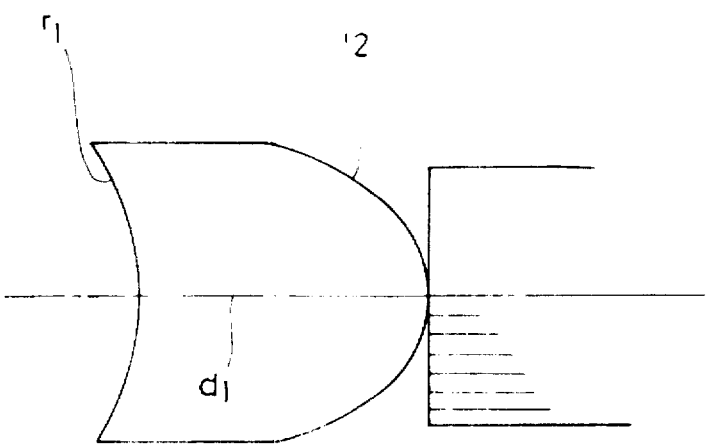
Figure 35:
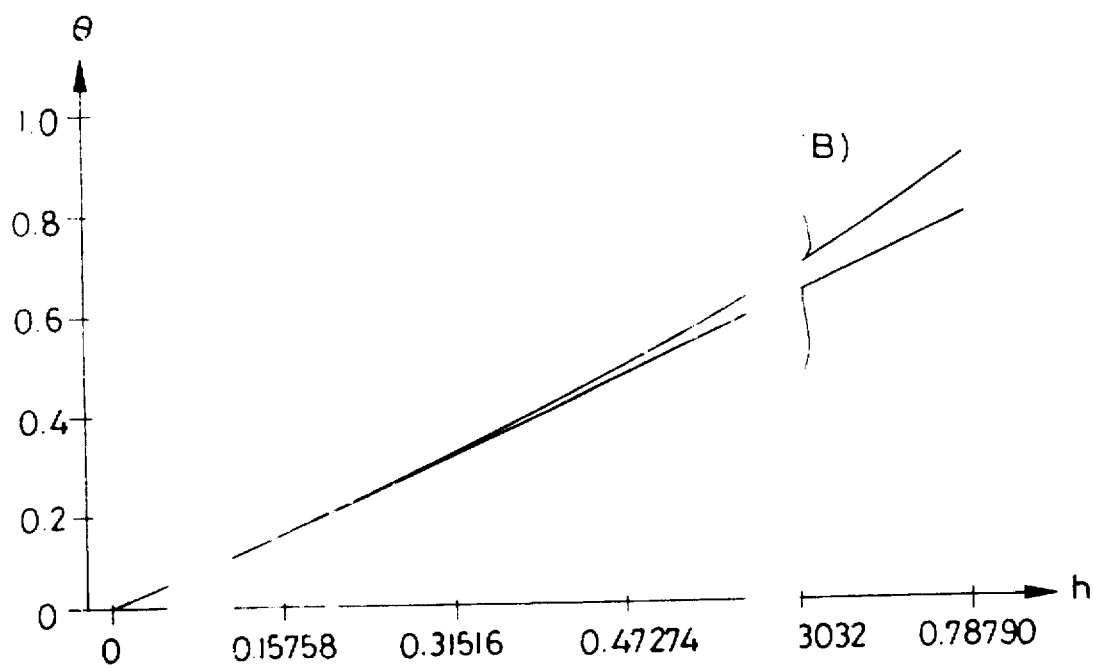

The ninth embodiment has a composition illustrated in FIG. 21, wherein the optical system consists of a positive lens component which has an aspherical surface and a concave surface on the object side. The ninth embodiment has the relationship between the height h of incident ray and the angle of emergence θ illustrated in FIG. 35. The aspherical surface can be shaped easily owing to the fact that the object side surface of the positive lens component is concave. The ninth embodiment is also compatible with an observation optical system having a field angle of 150°.

In FIGS. 22, 24, 26, 28 and 32 through 35, the curves A represent the relationship between h and θ in the first through the ninth embodiments, the curves B visualize h=f·sin θ, and the curves C indicate H=f·θ. Further, in FIGS. 21, 23, 25, 27 and 29, the curves a, b and c represent luminance distributions on planar surfaces, spherical surfaces and tubular surfaces respectively.

The aspherical surfaces used in the embodiments described above have shapes which are expressed by the following formula:

$$x = \frac{Ch^2}{1+\sqrt{1-PC^2h^2}} + Bh^2 + Eh^4 + Fh^6 + Gh^8 + \ldots$$

wherein the reference symbols x and h represent values on a coordinates system on which the optical axis is taken as the x axis regarding the direction toward an object as negative, an intersection between the aspherical surface and the optical axis is taken as an origin and the direction perpendicular to the x axis is taken as the h axis, the reference symbol C designates an inverse number of a radius of curvature on a sphere which is in contact with the aspherical surface in the vicinity of the optical axis (a radius of curvature on the reference sphere of the aspherical surface), the reference symbol p denotes a conical constant, and the reference symbols B, E, F, G, . . . represent aspherical surface coefficients of the second, fourth, sixth, eighth, . . . orders respectively.

As is understood from the foregoing description, the illumination optical system for endoscopes according to the present invention may be used in combination with endoscopes which have field angles of 110° and wider, and can provide favorable luminance distributions on all planar surface, spherical surfaces and tubular surfaces.

We claim:

1. An endoscope comprising an illumination optical system disposed on a distal end thereof for illuminating an object to be observed;

wherein said illumination optical system comprises in order from the object side, a positive lens component having an aspherical surface and being disposed on said

19 distal end of said endoscope, and a light emitting means;

wherein said positive lens component serves to diverge a ray emitted from said light emitting means to said object to be observed; and wherein a ray made incident upon said positive lens component in parallel with an optical axis intersects the optical axis at a point inside of said positive lens component due to refractive properties of said positive lens component.

2. An illumination optical system for endoscopes according to claim 1 wherein said aspherical surface has a shape having curvature on the aspherical surface which is lower than that on a reference sphere thereof as portions of said aspherical surface are farther from an optical axis.

3. An illumination optical system for endoscopes according to claim 2 wherein said light emitting means has a light emitting surface which extends in a direction perpendicular to the optical axis of said illumination optical system.

4. An illumination optical system for endoscopes according to claim 3, satisfying the following condition:

$$h = f \cdot \theta$$

wherein the reference symbol h represents a height of incidence, on said illumination optical system, of a ray that is emitted from said light emitting means in parallel with the optical axis of said illumination optical system and the reference symbol θ designates an angle of emergence of said ray having the height h of incidence from said illumination optical system, and the reference symbol f denotes a focal length of said positive lens component.

5. An illumination optical system for an endoscope comprising:

a light emitting means and an illumination lens system that comprises a positive lens component for directing rays emitted from said light emitting means to an object to be observed;

wherein said positive lens component comprises an aspherical surface having such a shape as to have curvature which becomes lower than that on a reference sphere thereof as portions of said aspherical surface are farther from an optical axis, wherein said light emitting means has a light emitting surface extending in a direction perpendicular to the optical axis of said illumination lens system, wherein said illumination lens system satisfies the following condition:

$$h = f \cdot \theta$$

wherein the reference symbol h represents a height of incidence, on said illumination lens system, of a ray which is emitted from said light emitting means in parallel with the optical axis of said illumination lens system, the reference symbol θ designates an angle of emergence, from said illumination lens system, of the ray having the height of incidence h and the reference symbol f denotes a focal length of said positive lens component, and wherein said illumination lens system further satisfies the following conditions:

$$\frac{0.5 \sin (h/f_1)}{\sqrt{n^2 - 0.5 \sin^2 (h/f_1)} - 1} \leq \frac{dF(h)}{dh} \leq$$

20

-continued $$\frac{1.5 \sin (h/f_1)}{\sqrt{n^2 - 1.5 \sin^2 (h/f_1)} - 1}$$

$$0 \leq h \leq D$$

wherein the reference symbol F(h) represents a function for expressing a shape of said aspherical surface, the reference symbol D designates a maximum value of said height of incidence ray, the reference symbol $f_1$ denotes a focal length of a lens component having the aspherical surface when the aspherical surface is replaced with the reference sphere thereof, and the reference symbol n represents the refractive index of the lens component having the aspherical surface.

6. An illumination optical system for endoscopes comprising:

a light emitting means and an illumination lens system comprising a positive lens component for directing rays emitted from said light emitting means to an object to be observed;

wherein said illumination lens system comprises an aspherical surface having such a shape as to have curvature which becomes lower than that on a reference sphere thereof as portions of said aspherical surface are farther from an optical axis, wherein said illumination optical system satisfies the following conditions:

$$h = f \cdot \sin \theta$$

$$\frac{0.6}{\sqrt{n^2 f_1^2 - 0.6 h^2} - f_1} \leq \frac{dF(h)}{dh} \leq \frac{1.2h}{\sqrt{n^2 f_1^2 - 2h^2} - f_1}$$

$$0 \leq h \leq D$$

wherein the reference symbol h represents a height of incidence, on said illumination lens system, of a ray which is emitted from said light emitting means in parallel with the optical axis of said illumination lens system, the reference symbol θ designates an angle of emergence, from said illumination lens system, of the ray having the height of incidence h and the reference symbol f denotes a focal length of said positive lens component, the reference symbol F(h) represents a function for expressing said aspherical surface, the reference symbol D designates a maximum value of said height of an incidence ray, the reference symbol $f_1$ designates a focal length of a lens component having the aspherical surface when said aspherical surface is replaced with, a reference sphere thereof and the reference symbol n represents the refractive index of the lens component having said aspherical surface.

7. An illumination optical system for endoscopes according to claim 2, 4, 5, or 6 wherein said positive lens component has an objective side surface coated with a water repellent.

8. An illumination optical system for endoscopes according to claim 2, 4, or 5 wherein a cylindrical reflecting member is disposed between said light emitting means and said positive lens component.

9. An illumination optical system for endoscope according to claim 2, 4, or 5 wherein a single optical fiber is disposed as a cylindrical reflecting body between said positive lens component and said light emitting means.

10. An illumination optical system for endoscopes according to claim 9 satisfying the following condition:

$$F_B < 0$$

wherein the reference symbol $F_B$ represents a distance as measured from a final surface of said illumination optical system as a whole in which the aspherical surface is replaced with the reference sphere thereof to a rear focal point of said illumination optical system, and the distance is to be taken as positive when it is measured in the direction from the final surface toward the light source or negative when it is measured in the direction from the final surface toward the object side.

11. An illumination optical system for endoscopes according to claims 2, 4, or 5 wherein said positive lens component has a refractive index n satisfying the following condition:

$$n \geq 1.6$$

12. An illumination optical system for endoscopes according to claim 2 wherein said light emitting means is an end surface on an optical fiber bundle composed of a large number of optical fibers which are fusion-welded to one another.

13. An illumination optical system for endoscopes according to claim 5 wherein a cylindrical reflecting body is disposed between said positive lens component and said light emitting means, and wherein said cylindrical reflecting body satisfies the following condition:

$$2d < L$$

wherein the reference symbol d represents a radius of cylindrical reflecting body and the reference symbol L designates a length of said cylindrical reflecting body.

14. An illumination optical system for endoscopes comprising:

a light emitting means and an illumination lens system including a positive lens component for directing rays emitted from said light emitting means to an object to be observed;

wherein said illumination lens system comprises an aspherical surface having such a shape as to have a curvature which becomes lower than that of a reference sphere thereof as portions of said aspherical surface are farther from the optical axis, and wherein said positive lens component further satisfies the following conditions:

$$\frac{0.5 \sin(h/f_1)}{\sqrt{n^2 - 0.5 \sin^2(h/f_1)} - 1} \leq \frac{dF(h)}{dh} \leq \frac{1.2h}{\sqrt{n^2 f_1^2 - 2h^2} - f_1}$$

$$0 \leq h \leq D$$

wherein the reference symbol F(h) represents a function for expressing a shape of said aspherical surface, the reference symbol D designates a maximum value of the height of incidence h, the reference symbol f represents the focal length of a lens component having said aspherical surface when said aspherical surface is replaced with a reference sphere thereof and the reference symbol n represents a refractive index of a lens component having said aspherical surface.

15. An illumination optical system for endoscopes comprising:

a light emitting means and an illumination lens system which comprises a positive lens component and serves for directing rays emitted from said light emitting means to an object to be observed;

wherein said illumination lens system comprises an aspherical surface having such a shape as to have a curvature which becomes lower than that of a reference sphere thereof as portions of said aspherical surface are farther from an optical axis, wherein a positive lens component is disposed between said lens component having the aspherical surface and said light emitting means, and wherein said illumination optical system satisfies the following condition:

$$\phi_3 < \phi_2$$

wherein the reference symbol $\phi_2$ represents a refractive power of a reference sphere of a surface, disposed on the side of said light emitting means, of the lens component having said aspherical surface and the reference symbol $\phi_3$ designates a refractive power of a reference sphere of an object side surface of said positive lens component disposed between said lens component having the aspherical surface and said light-emitting means.

16. An illumination optical system for endoscopes according to claim 15 satisfying the following condition:

$$0 \leq y < f_B$$

wherein the reference symbol y represents a distance as measured from the surface, disposed on the side of said light emitting means, of the lens component having said aspherical surface to the object side surface of said positive lens component and the reference symbol $f_B$ designates a distance as measured from the surface, disposed on the side of said light emitting means, of the lens component having said aspherical surface to a rear focal point of the lens component.

* * * * *